(12) United States Patent
Okada

(10) Patent No.: US 10,627,609 B2
(45) Date of Patent: Apr. 21, 2020

(54) ZOOM LENS AND IMAGING APPARATUS

(71) Applicant: Tamron Co., Ltd., Saitama-shi (JP)

(72) Inventor: Keisuke Okada, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 59 days.

(21) Appl. No.: 15/962,427

(22) Filed: Apr. 25, 2018

(65) Prior Publication Data

US 2019/0049707 A1   Feb. 14, 2019

(30) Foreign Application Priority Data

Aug. 8, 2017   (JP) .................. 2017-153068

(51) Int. Cl.
   *G02B 15/14*      (2006.01)
   *G02B 13/06*      (2006.01)
   (Continued)

(52) U.S. Cl.
   CPC ............. *G02B 15/142* (2019.08); *G02B 7/14* (2013.01); *G02B 9/04* (2013.01); *G02B 13/06* (2013.01); *G02B 15/1431* (2019.08); *G02B 15/1441* (2019.08); *G02B 27/0037* (2013.01); *H04N 5/335* (2013.01)

(58) Field of Classification Search
   CPC .. G02B 15/14; G02B 15/143; G02B 15/1431; G02B 15/143101; G02B 15/143105; G02B 15/144; G02B 15/1441; G02B 15/144101; G02B 15/144105; G02B 15/144109; G02B 15/144113; G02B 15/145; G02B 15/1451; G02B 15/145101; G02B 15/145105; G02B 15/145109; G02B 15/145113; G02B 15/145117; G02B 15/145121;
   (Continued)

(56) References Cited

U.S. PATENT DOCUMENTS 7,839,577 B2 * 11/2010 Yamamoto ........... G02B 27/646
                                                          359/676
2008/0198475 A1 *  8/2008 Arimoto ............... G02B 15/142
                                                          359/687
(Continued)

FOREIGN PATENT DOCUMENTS

JP           201555858 A      3/2015
JP           2015200870 A    11/2015

*Primary Examiner* — Darryl J Collins
(74) *Attorney, Agent, or Firm* — The Webb Law Firm

(57) ABSTRACT

The present invention provides a zoom lens that can perform favorable correction of chromatic aberration in the entire zoom range, and can have higher performance and a smaller size than conventional ones; and an imaging apparatus including the zoom lens. To achieve the object, provided are a zoom lens and an imaging apparatus including the zoom lens. The zoom lens includes, in order from an object side: a positive first lens group G1; a negative second lens group G2; and a GR group including one or more lens groups. In the zoom lens, changing focal length is performed by varying intervals between the lens groups. The GR group has at least two cemented surfaces having negative refractive power, convex lenses GpH and GpL satisfying predetermined conditional expressions. An aperture stop is arranged in the first lens group or after. The zoom lens satisfies predetermined conditional expressions.

5 Claims, 27 Drawing Sheets

(51) Int. Cl.
*G02B 7/14* (2006.01)
*G02B 27/00* (2006.01)
*H04N 5/335* (2011.01)
*G02B 9/04* (2006.01)

(58) Field of Classification Search
CPC .......... G02B 15/145129; G02B 15/146; G02B 15/1461; G02B 15/15; G02B 15/16; G02B 13/009
USPC .................................. 359/676–679, 686–690
See application file for complete search history.

(56) References Cited

U.S. PATENT DOCUMENTS

| | | |
|---|---|---|
| 2015/0277090 A1 | 10/2015 | Sugita |
| 2015/0338622 A1* | 11/2015 | Kuzuhara ............ G02B 15/173 348/240.3 |
| 2015/0350558 A1* | 12/2015 | Uchida ................ G02B 15/17 348/347 |

* cited by examiner

ZOOM LENS AND IMAGING APPARATUS

CROSS-REFERENCE TO RELATED APPLICATION

This application claims priority to Japanese Patent Application No. 2017-153068 filed Aug. 8, 2017, the disclosure of which is hereby incorporated in its entirety by reference.

BACKGROUND OF THE INVENTION

Field of the Invention

This invention relates to a zoom lens suitable for imaging optical systems, such as film cameras, video cameras, and digital still cameras, and an imaging apparatus including the zoom lens.

Description of the Related Art

An imaging apparatus using a solid-state imaging device, such as a digital camera or a video camera, has been widely used. As pixel density in the solid-state imaging device increases, a higher performance has been required for imaging optical systems used in imaging apparatuses. In addition, with reductions in the sizes of imaging apparatuses, reductions in the sizes of imaging optical systems have been required.

For interchangeable lens imaging apparatuses, such as single-lens reflex cameras, zoom lens that adjust the focal length according to the distance to an object to change an image viewing angle are widely used.

For example, Japanese Patent Laid-Open No. 2015-55858 discloses so-called standard large-aperture zoom lens for SLRs. The zoom lens disclosed in Japanese Patent Laid-Open No. 2015-55858 consists of, in order from the object side, a first lens group having positive refractive power, a second lens group having negative refractive power, and the rear lens group including one or more lens groups. In the zoom lens, a positive lens, which is made of glass and has a low-refractive index, a low-dispersion, and a positive extraordinary dispersion, is arranged in the first lens group having positive refractive power, thereby suppressing variations in chromatic aberration during zooming. However, in the zoom lens, variations in chromatic aberration during zooming are not adequately suppressed; therefore, a further increase in performance is required in the entire zoom range.

Meanwhile, Japanese Patent Laid-Open No. 2015-200870 discloses a high-magnification zoom lens for SLRs. The zoom lens disclosed in Japanese Patent Laid-Open No. 2015-200870 consists of, in order from the object side, a first lens group having positive refractive power, a second lens group having negative refractive power, a third lens group having an aperture stop on the object side and positive refractive power, a fourth lens group having negative refractive power, and a fifth lens group having positive refractive power. In the zoom lens, the optimization of the glass material and the like for the positive lens in the second lens group leads to suppression of occurrence of chromatic aberration and an increase in performance. However, this zoom lens is large, which means the requirement for a reduction in the size of the imaging optical system is not addressed.

SUMMARY OF THE INVENTION

Consequently, an object of the present invention is to provide a zoom lens that can perform favorable correction of chromatic aberration in the entire zoom range, and can have higher performance and a smaller size than conventional ones; and an imaging apparatus including the zoom lens.

To solve the aforementioned problems, a zoom lens according to the present invention consists of, in order from the object side, a first lens group having positive refractive power, a second lens group having negative refractive power, and a GR group including one or more lens groups. In the zoom lens, changing focal length is performed by varying intervals between the lens groups. The second lens group moves toward the object during changing focal length from the wide angle end to the telephoto end. The GR group includes at least two cemented surfaces having negative refractive power, one or more convex lens GpH satisfying the following conditional expressions (1) and (2), and one or more convex lens GpL satisfying the following conditional expression (3). The zoom lens includes, in the first lens group or after, an aperture stop satisfying the following conditional expression (4) and conditional expression (5).

$$1.80 < ndpH < 2.50 \tag{1}$$

$$10.0 < vdpH < 35.0 \tag{2}$$

$$60.0 < vdpL < 100.0 \tag{3}$$

$$1.00 < hGpH/hStop < 2.00 \tag{4}$$

$$0.90 < f1/fw < 6.75 \tag{5}$$

Here,
ndpH is the refractive index related to the d-line of the convex lens GpH,
vdpH is the Abbe constant related to the d-line of the convex lens GpH,
vdpL is the Abbe constant related to the d-line of the convex lens GpL,
hGpH is the maximum height from the optical axis when on-axis luminous flux passes through the surface of the convex lens GpH on the object side, at the telephoto end of the zoom lens,
hStop is the maximum height from the optical axis when on-axis luminous flux passes through the aperture stop, at the telephoto end of the zoom lens,
f1: the focal length of the first lens group, and
fw: the focal length of the zoom lens at the wide angle end.

To solve the aforementioned problem, an imaging apparatus of the present invention includes the zoom lens and an imaging device that is arranged on the image side of the zoom lens and converts an optical image formed by the zoom lens to electrical signals.

The present invention can provide a zoom lens that can perform favorable correction of chromatic aberration in the entire zoom range, and can have higher performance and a smaller size than conventional ones; and an imaging apparatus including the zoom lens.

Figure 1:
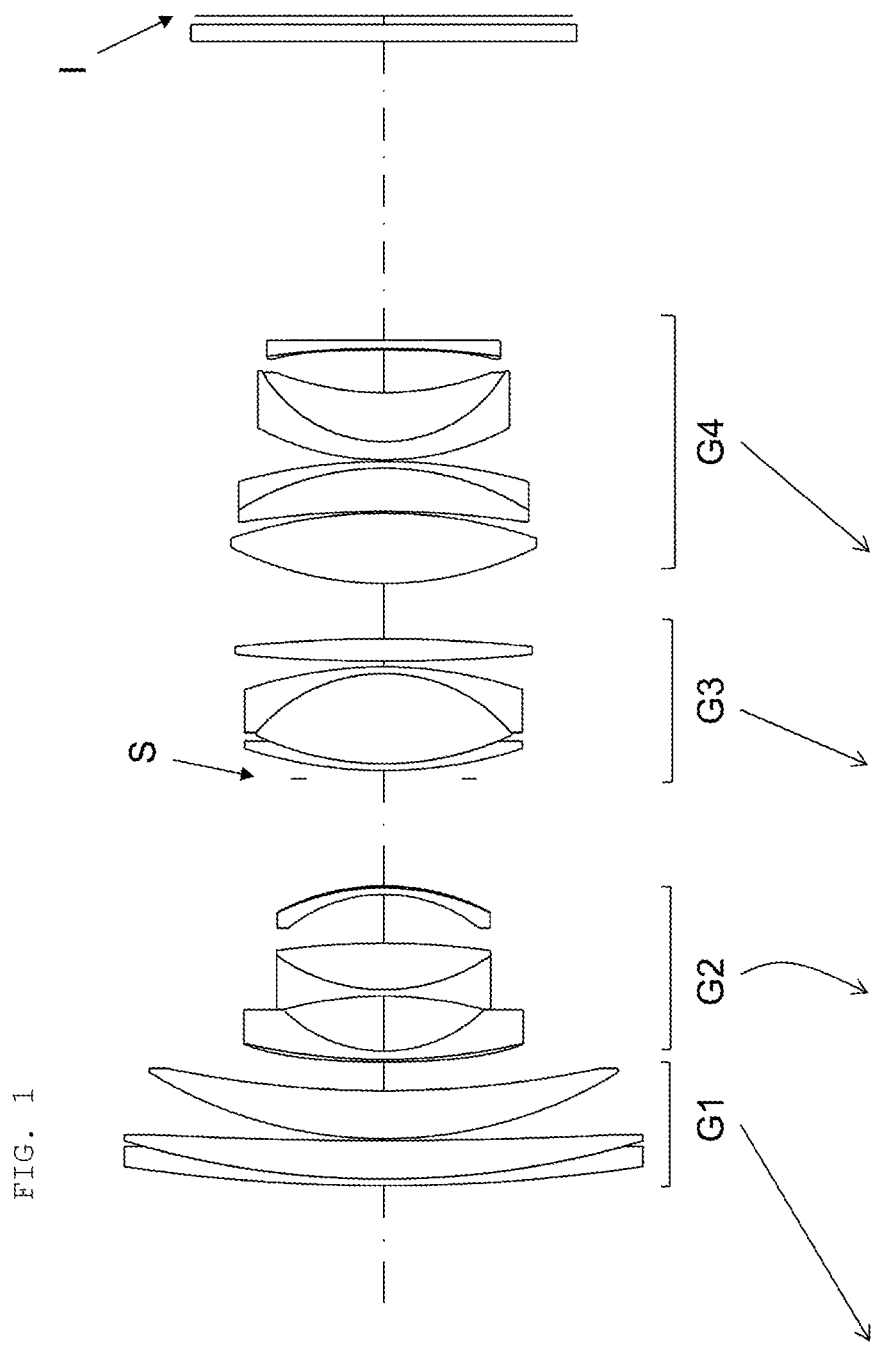
FIG. 1 is a cross-sectional view of a lens configuration example of a zoom lens of Example 1 of the present invention at a time of focusing to infinity at the wide angle end.

As for the reference numerals used in the aforementioned drawings, G1 represents the first lens group, G2 represents the second lens group, G3 represents the third lens group, G4 represents the fourth lens group, G5 represents the fifth lens group, G6 represents the sixth lens group, S represents an aperture stop, and I represents an image plane.

DESCRIPTION OF THE INVENTION

Embodiments of a zoom lens and imaging apparatus according to the present invention will now be described. Note that the zoom lens and the imaging apparatus described below are merely one aspect of the zoom lens and imaging lens and imaging apparatus according to the present invention, and the zoom lens and imaging apparatus according to the present invention are not limited to the following aspect.

1. Zoom Lens 1-1. Configuration of Zoom Lens

An embodiment of a zoom lens according to the present invention will be first described. The zoom lens of this embodiment includes, in order from the object side, a first lens group having positive refractive power, a second lens group having negative refractive power, and a GR group including one or more lens groups, and changing focal length is performed by varying intervals between the lens groups. During changing focal length from the wide angle end to the telephoto end, the second lens group moves toward the object.

1-1-1. First Lens Group

The first lens group may have any detailed lens configuration if it generally has positive refractive power. For example, to achieve favorable aberration correction and provide a high-performance zoom lens, the first lens group preferably includes at least one negative lens. Further, the first lens group preferably includes, in order from the object side, a negative lens and a positive lens, more preferably, in order from the object side, a negative lens, a positive lens, and a positive lens. Consequently, while large positive refractive power is arranged in the first lens group, the amount of generation of spherical aberration can be suppressed and a high zoom ratio and downsizing can be attained. It should be noted that an appropriate lens configuration can be employed depending on the required optical performance.

1-1-2. Second Lens Group

Similarly, the second lens group may have any detailed lens configuration if it generally has negative refractive power. For example, to achieve favorable aberration correction and provide a high-performance zoom lens, the second lens group preferably includes at least one positive lens. It should be noted that an appropriate lens configuration can be employed depending on the required optical performance.

1-1-3. GR Group

The GR group, which includes one or more lens groups, is a general name for the lens group arranged on the image side of the second lens group in the zoom lens. The GR group includes at least two cemented surfaces having negative refractive power, one or more convex lens GpH satisfying the following conditional expressions (1) and (2), and one or more convex lens GpL satisfying the following conditional expression (3).

The GR group may consist of one lens group or a plurality of lens groups. The larger the number of lens groups in the zoom lens, the more advantageous in achieving a high zoom ratio and high optical performance. On the other hand, the larger the number of lens groups in the zoom lens, the more difficult the downsizing, weight reduction, and cost reduction of the zoom lens, and the more complicated the moving mechanism, etc. for moving the lens groups along the optical axis during changing focal length. In view of these points, the number of lens groups in the GR group is preferably five or less, more preferably four or less. In addition, the GR group preferably includes, in a position closest to the object, a third lens group having positive refractive power, and more preferably, the GR group includes, in order from the object side, the third lens group having positive refractive power and a fourth lens group having positive refractive power. It should be noted that the GR group may have any lens group configuration if the GR group includes at least two of the cemented surface, the convex lens GpH, and the convex lens GpL.

In addition, the GR group may have either positive refractive power or negative refractive power, but preferably has positive refractive power as a whole. In the type of the zoom lens as in this example, at the wide angle end, the composite focal length of the first lens group and the second lens group is a negative value. For forming an object image on the image plane, positive refractive power needs to be arranged in the GR group. For this reason, in the type of the zoom lens as in this example, the GR group preferably has positive refractive power as a whole. Arranging positive refractive power in the entire GR group is also preferable for achieving a large-aperture zoom lens with a small F number.

In the case where the GR group consists of a plurality of lens groups, the cemented surface having negative refractive power may be arranged in only one the lens groups or may be arranged in different lens groups.

In the present invention, a cemented surface having negative refractive power refers to the following optical surface. First, a cemented surface refers to an interface between lenses cemented together in a cemented lens consisting of two or more lenses cemented together. A cemented surface having negative refractive power means that the sign of refractive power ($\varphi$) of the cemented surface which is represented by the following expression is negative ($\varphi<0$). It should be noted that, in the case of a cemented surface which is a convergence surface, the sign of refractive power of the cemented surface is positive ($\varphi>0$).

$$\varphi=(n2-n1)/r$$

Here, $\varphi$ is refractive power of the cemented surface, n1 is the refractive index of the lens arranged on the object side of the cemented surface, n2 is the refractive index of the lens arranged on the image plane side of the cemented surface, and r is the curvature radius of the cemented surface (the sign of the curvature radius of the cemented surface is positive if the center of curvature of the cemented surface is on the positive side than the intersection point of the cemented surface and the optical axis, and the sign of the curvature radius of the cemented surface is negative if the center of curvature of the cemented surface is on the negative side than the intersection point of the cemented surface and the optical axis, when the light traveling direction, i.e., the direction from the object to the image plane is positive).

By arranging at least two cemented surfaces having negative refractive power in the GR group, negative spherical aberration and negative longitudinal chromatic aberration that occur on a convergence surface arranged in the GR group can be canceled out by the cemented surfaces having negative refractive power. Consequently, high performance zoom lens in which chromatic aberration in the entire zoom range is well corrected is achieved.

To obtain the aforementioned advantageous effects, the GR group preferably includes at least one concave cemented surface on the object side, and at least one concave cemented surface on the image plane side. The concave cemented surface on the object side is preferred for correction of mainly the spherical aberration and longitudinal chromatic aberration related to longitudinal ray. The concave cemented surface on the image plane side is preferred for correction of mainly field curvature and chromatic aberration of magnification.

Further, from view of these points of achieving preferred optical performance in a large-aperture zoom lens, the GR group preferably includes at least two concave cemented surfaces having negative refractive power, on the object side. For example, the GR group preferably includes a cemented lens including a concave cemented surface on the object side and a concave cemented surface on the image plane side, i.e., a cemented lens consisting of three lenses cemented together, and a cemented lens including a concave cemented surface having negative refractive power, on the object side (a cemented lens consisting of two or more lenses cemented together).

The GR group includes one or more convex lens GpH and one or more convex lens GpL in addition to the aforementioned at least two cemented surfaces having negative refractive power. The convex lens GpH and the convex lens GpL will be described later. Moreover, it is preferable that the GR group include one or more lens groups having positive refractive power and one or more convex lens GpH be arranged in any of the lens groups having positive refractive power. This matter will also be described later.

(4) Aperture Stop

The zoom lens includes an aperture stop in the first lens group or after. Here, "The zoom lens includes an aperture stop in the first lens group or after." means that the aperture stop is arranged in the first lens group or between the first lens group and the image plane. The aperture stop in the optical system of the zoom lens can be arranged in any position if it satisfies the following conditional expression (4). For example, although an aperture stop is arranged on the object side in the GR group (i.e., on the image side of the second lens group) in the example described below, in a zoom lens according to the present invention, an aperture stop may be arranged in any appropriate position, e.g., in the GR group or on the image side of the first lens group, depending on the size of the imaging device, the range of the image viewing angle of the zoom lens, and the like.

(5) Operation During Changing Focal Length

In the zoom lens, changing focal length is performed by varying intervals between the lens groups, and the second lens group moves toward the object during changing focal length from the wide angle end to the telephoto end. Moving the second lens group toward the object during changing focal length from the wide angle end to the telephoto end can shorten the entire optical length of the zoom lens at the wide angle end and reduce in the size of the lens which is closest to the object side in the zoom lens at the telephoto end. This leads to a reduction in the size of the zoom lens.

Here, in the present invention, movement of the second lens group toward the object during changing focal length from the wide angle end to the telephoto end means that the position of the second lens group on the optical axis at the telephoto end is closer to the object, compared with at the wide angle end. In other words, during changing focal length from the wide angle end to the telephoto end, the path of the second lens group is not necessarily linear, and the second lens group may move in such a manner that it draws a path protruding toward the image plane.

In the present invention, varying intervals between the lens groups during changing focal length means that the interval between the first lens group and the second lens group and the interval between the second lens group and the GR group vary during changing focal length. If the GR group consists of a plurality of lens groups, intervals between the lens groups in the GR group vary during changing focal length. As long as the intervals between the lens groups changes during changing focal length, all the lens groups may be movable groups that move in the direction of the optical axis during changing focal length, or any one or more lens groups may be fixed groups. In the zoom lens, the direction of movement of the other lens groups is not particularly limited except that the second lens group which moves toward the object.

1-2. Conditional Expression

The zoom lens employs the aforementioned configuration and satisfies at least one of the conditional expressions described below, thereby enabling favorable correction of chromatic aberration in the entire zoom range. Hence, the zoom lens achieves higher performance and has a smaller size than conventional ones, and has high optical performance. To achieve the aforementioned advantageous effects, the zoom lens preferably satisfies, in particular, the following conditional expressions (1) to (5).

1-2-1. Conditional Expression (1)

The convex lens GpH included in the GR group satisfies the following conditional expression (1).

$$1.80 < ndpH < 2.50 \tag{1}$$

Here, ndpH is the refractive index related to the d-line of the convex lens GpH

The conditional expression (1) is an expression defining the refractive index related to the d-line of the convex lens GpH in the GR group. Since the convex lens satisfying the conditional expression (1) is arranged in the GR group, even if the aperture of the zoom lens is increased, the occurrence of spherical aberration and coma aberration can be suppressed within an appropriate range, so that favorable correction of these aberrations can be achieved with a small number of lenses.

In contrast, if the value of the conditional expression (1) is at or below the lower limit, the refractive index related to the d-line of the convex lens GpH is lower than an appropriate value. Therefore, to provide required refractive power to the convex lens GpH, the curvature of each optical surface of the convex lens GpH should be large (the curvature radius should be small). If the curvature of each optical surface is large, the spherical aberration and coma aberration occurring on the convex lens GpH are large. This makes it difficult to correct these aberrations with a small number of lenses, to achieve aberration correction in the entire optical system of the zoom lens, and to provide a zoom lens that offers high performance and is compact in the entire zoom range.

In contrast, if the value of the conditional expression (1) is at or higher the upper limit, the refractive index related to the d-line of the convex lens GpH is higher than the appropriate value. In this case, a reduction in optical performance due to surface figure irregularity (local distortion on an optical surface) and decentering is significant, and it is difficult to provide a zoom lens that offers high performance and is compact in the entire zoom range due to the manufacturing error.

To obtain these advantageous effects, in the conditional expression (1), the lower limit is preferably 1.81, more preferably 1.85. The upper limit in the expression is preferably 2.10, more preferably 2.00, more preferably 1.94.

1-2-2. Conditional Expression (2)

The convex lens GpH included in the GR group satisfies the following conditional expression (2).

$$10.0 < vdpH < 35.0 \tag{2}$$

Here, vdpH is the Abbe constant related to the d-line of the convex lens GpH.

The conditional expression (2) defines the Abbe constant related to the d-line of the convex lens GpH in the GR group. When the conditional expression (2) is satisfied, at the telephoto end, positive longitudinal chromatic aberration caused by negative refractive power component in the zoom lens can be corrected to negative. Consequently, the secondary spectrum can be minimized, and the chromatic aberration related to the zoom lens can be made extremely small in the entire zoom range.

In contrast, if the value of the conditional expression (2) is at or below the lower limit, the Abbe constant related to the d-line of the convex lens GpH is lower than an appropriate range, which means that, the convex lens GpH is composed of a high-dispersion glass material compared with the case where the conditional expression (2) is satisfied. In this case, positive longitudinal chromatic aberration caused by negative refractive power component in the zoom lens is corrected excessively, which makes it difficult to make the chromatic aberration in the zoom lens small.

In contrast, if the value of the conditional expression (2) is at or above the upper limit, the Abbe constant related to the d-line of the convex lens GpH is higher than the appropriate range, which means that, the convex lens GpH is composed of a low-dispersion glass material compared with the case where the conditional expression (2) is satisfied. In this case, positive longitudinal chromatic aberration caused by negative refractive power component in the zoom lens is corrected deficiently, which makes it difficult to make the chromatic aberration in the zoom lens small.

To obtain these advantageous effects, in the conditional expression (2), the lower limit is preferably 15.0, more preferably 17.5. The upper limit in the expression is preferably 33.00, more preferably 30.0, more preferably 25.0.

In the zoom lens, the GR group includes at least one convex lens GpH satisfying the conditional expressions (1) and (2). Although the GR group may include multiple convex lenses GpH, a single convex lens GpH is enough to achieve reductions in the size and cost of the zoom lens.

Here, it is preferable that the GR group include at least one lens group having positive refractive power, and the convex lens GpH be arranged in a lens group having positive refractive power in the GR group. The convex lens GpH in the GR group is arranged in the lens group having positive refractive power, thereby suppressing a negative spherical aberration that occurs at the telephoto end. At the same time, a positive longitudinal chromatic aberration that occurs at the telephoto end can be corrected to negative, and the secondary spectrum can be minimized, thereby facilitating the completion of a zoom lens with extremely small chromatic aberration in the entire zoom range.

More preferably, the convex lens GpH is a single lens having positive refractive power. A single lens refers to a single lens (optical element) including optical surfaces arranged on the object side and the image plane side, respectively. In the single lens, various coatings, such as an anti-reflecting film and a protection film, may be applied to these optical surfaces or an aspherical sheet or the like may be applied to the optical surfaces. An optical surface in the single lens may have any shape, for example, a spherical or aspherical shape. The optical surface may be flat on one side. The single lens may be manufactured by any method, such as polishing, molding, or injection molding. A single lens here is a lens consisting of only one single lens, and is excepted, for example, a plurality of lenses including a positive lens and a negative lens the optical surfaces of which are cemented or in close contact without an air layer therebetween.

1-2-3. Conditional Expression (3)

The convex lens GpL included in the GR group satisfies the following conditional expression (3).

$$60.0 < vdpL < 100.0 \tag{3}$$

Here, vdpL is the Abbe constant related to the d-line of the convex lens GpL.

The conditional expression (3) defines the Abbe constant related to the d-line of the convex lens GpL in the GR group. When the conditional expression (3) is satisfied, at the telephoto end, positive longitudinal chromatic aberration caused by negative refractive power component in the zoom lens can be corrected to negative. Consequently, the secondary spectrum can be minimized, and the chromatic aberration related to the zoom lens can be made extremely small in the entire zoom range.

In contrast, if the value of the conditional expression (3) is at or below the lower limit, the Abbe constant related to the d-line of the convex lens GpL is lower than an appropriate range, which means that, the convex lens GpL is composed of a high-dispersion glass material compared with the case where the conditional expression (3) is satisfied. In this case, positive longitudinal chromatic aberration caused by negative refractive power component in the zoom lens is corrected excessively, which makes it difficult to make the chromatic aberration in the zoom lens small with a small number of lenses.

In contrast, if the value of the conditional expression (3) is at or above the upper limit, the Abbe constant related to the d-line of the convex lens GpL is higher than the appropriate range, which means that, the convex lens GpL is composed of a low-dispersion glass material compared with the case where the conditional expression (3) is satisfied. In this case, positive longitudinal chromatic aberration caused by negative refractive power component in the zoom lens is corrected deficiently, which makes it difficult to make the chromatic aberration in the zoom lens small with a small number of lenses.

To obtain these advantageous effects, in the conditional expression (3), the lower limit is preferably 64.0, more preferably 68.0.

In the zoom lens, the GR group includes at least one convex lens GpL satisfying the conditional expression (3). The GR group preferably includes multiple convex lenses GpL. The GR group preferably includes two or more convex lenses GpL, more preferably three or more convex lenses GpL. When the GR group includes a plurality of convex lenses GpL, more favorable correction of the longitudinal chromatic aberration and the chromatic aberration of magnification in the entire zoom range can be achieved, so that it becomes easier to make the chromatic aberration related to the zoom lens extremely small in the entire zoom range.

1-2-4. Conditional Expression (4)

The zoom lens preferably satisfies the following conditional expression (4).

$$1.00 < hGpH/hStop < 2.00 \quad (4)$$

Here, hGpH is the maximum height from the optical axis when on-axis luminous flux passes through the surface of the convex lens GpH on the object side, at the telephoto end of the zoom lens, and hStop is the maximum height from the optical axis when on-axis luminous flux passes through the aperture stop, at the telephoto end of the zoom lens.

The conditional expression (4) defines a ratio of the maximum height from the optical axis when on-axis luminous flux passes through the surface of the convex lens GpH on the object side to the maximum height from the optical axis when on-axis luminous flux passes through the aperture stop, at the telephoto end of the zoom lens. When the conditional expression (4) is satisfied, the maximum height from the optical axis when on-axis luminous flux passes through the surface of the convex lens GpH on the object side becomes within an appropriate, and positive longitudinal chromatic aberration caused by negative refractive power component in the zoom lens can be corrected to negative. Consequently, the secondary spectrum can be minimized, and the chromatic aberration related to the zoom lens can be made extremely small in the entire zoom range. If the GR group includes a plurality of convex lenses GpH, at least one of the convex lenses GpH satisfies the conditional expression (4).

In contrast, if the value of the conditional expression (4) is at or below the lower limit, the maximum height from the optical axis when on-axis luminous flux passes through the surface of the convex lens GpH on the object side falls below an appropriate range. In this case, positive longitudinal chromatic aberration caused by negative refractive power component in the zoom lens is corrected deficiently, which makes it difficult to make the chromatic aberration in the zoom lens small.

In contrast, if the value of the conditional expression (4) is at or above the upper limit, the maximum height from the optical axis when on-axis luminous flux passes through the surface of the convex lens GpH on the object side exceeds the appropriate range. In this case, positive longitudinal chromatic aberration caused by negative refractive power component in the zoom lens is corrected excessively, which makes it difficult to make the chromatic aberration in the zoom lens small.

To obtain these advantageous effects, in the conditional expression (4), the lower limit is preferably 1.10. The upper limit in the expression is preferably 1.75, more preferably 1.50, more preferably 1.40.

1-2-5. Conditional Expression (5)

The zoom lens preferably satisfies the following conditional expression (5).

$$0.90 < f1/fw < 6.75 \quad (5)$$

Here, f1 is the focal length of the first lens group, and fw is the focal length of the zoom lens at the wide angle end.

The conditional expression (5) defines a ratio of the focal length of the first lens group to the focal length of the zoom lens at the wide angle end. Since the conditional expression (5) is satisfied, the occurrence of spherical aberration and coma aberration occurring in the first lens group can be suppressed within an appropriate range, so that favorable aberration correction can be achieved with a small number of lenses. At the same time, the amount of movement of the first lens group for obtaining a predetermined magnification can fall within an appropriate range. Consequently, the zoom lens can offer high performance in the entire zoom range and be made compact.

In contrast, if the value of the conditional expression (5) is at or below the lower limit, the ratio of the focal length of the first lens group to the focal length of the zoom lens at the wide angle end falls below an appropriate range. In other words, refractive power of the first lens group becomes strong, exceeding an appropriate range. In this case, at the wide angle end, the occurrence of spherical aberration and coma aberration in the first lens group exceeds an appropriate range, which makes it difficult to obtain favorable optical performance in the entire zoom range.

In contrast, if the value of the conditional expression (5) is at or above the upper limit, the ratio of the focal length of the first lens group to the focal length of the zoom lens at the wide angle end exceeds the appropriate range. In other words, refractive power of the first lens group becomes weak, falling below the appropriate range. In this case, the amount of movement of the first lens group for obtaining a predetermined magnification becomes large, exceeding the appropriate range. Consequently, the full length of the zoom lens increases, which makes it difficult to reduce the size of the zoom lens relative to the overall product. In a typical zoom lens, one or more inner tubes are nestled within a lens barrel (outermost tube). If the difference between the entire optical lengths at the telephoto end and the wide angle end increases, in order to shorten the full length of the lens barrel with the inner tubes accommodated within the lens barrel, the plurality of inner tubes is accommodated in the outermost tube. This is not preferable because, in this case, a cam structure for ejecting the lens barrel (the inner tubes) is complicated, the diameter of the outermost tube is made large considering the thickness of the inner tubes, and the barrel has a large outer diameter.

To obtain these advantageous effects, in the conditional expression (5), the lower limit is preferably 1.50, more preferably 2.00, more preferably 2.50, more preferably 3.00, more preferably 3.15, more preferably 3.30. The upper limit is preferably 6.50, more preferably 6.00, more preferably 5.50, more preferably 5.30, more preferably 5.10.

1-2-6. Conditional Expression (6)

The zoom lens preferably satisfies the following conditional expression (6).

$$0.95 < Fno\_t < 5.60 \quad (6)$$

Here,

Fno_t is the F number of the zoom lens at the telephoto end.

The conditional expression (6) defines the F number of the zoom lens at the telephoto end. If the conditional expression (6) is satisfied, more effective correction of the longitudinal chromatic aberration at the telephoto end can be achieved, favorable correction of the longitudinal chromatic aberration and chromatic aberration of magnification in the entire zoom range can be achieved, and the zoom lens can exhibit higher optical performance.

To obtain these advantageous effects, in the conditional expression (6), the lower limit is preferably 1.20, more preferably 1.40, more preferably 1.80, and more preferably 2.00. The upper limit is preferably 4.50.

2. Imaging Apparatus

An imaging apparatus of the present invention will now be described. An imaging apparatus according to the present invention includes the zoom lens according to the present invention and an imaging device that is arranged on the image side of the zoom lens and converts an optical image formed by the zoom lens to electrical signals. Here, any imaging device, for example, a solid-state imaging device, such as a CCD sensor or a CMOS sensor, can be used. An imaging apparatus of the present invention is suitable for a digital camera or a video camera and an imaging apparatus including any of these imaging devices. Not surprisingly, the imaging apparatus may be a lens-fixed imaging apparatus in which a lens is fixed to a housing, or an interchangeable lens imaging apparatus, such as an SLR or mirrorless interchangeable lens camera.

The details of the present invention will now be described with reference to an example. It should be noted that the present invention is not limited to the following example. The optical system in each of the following examples is a shooting optical system used for a digital camera, a video camera, or an imaging apparatus (optical device), such as a silver-salt film camera. In addition, in the cross sectional view of each lens, the left side corresponds to the object side and the right side corresponds to the image side.

Example 1

(1) Configuration of Optical System

FIG. 1 is a cross-sectional view of a lens configuration example of a zoom lens of Example 1 of the present invention. The zoom lens consists of, in order from the object side, a first lens group G1 having positive refractive power, a second lens group G2 having negative refractive power, a third lens group G3 having positive refractive power, and a fourth lens group having positive refractive power, and achieves changing focal length by varying the intervals between the lens groups. During changing focal length from the wide angle end to the telephoto end, the first lens group G1 moves toward the object, the second lens group G2 moves toward the object in such a manner that it draws a path protruding toward the image plane, the third lens group G3 moves toward the object, and the fourth lens group G4 moves toward the object. The moving paths of the lens groups are all different.

In the zoom lens of Example 1, the third lens group G3 and the fourth lens group G4 constitute a GR group of the present invention. The 17th surface and the 18th surface included in the third lens group G3, and the 25th surface and the 28th surface included in the fourth lens group G4 are cemented surfaces having negative refractive power in the present invention (see Table 1). In addition, in the third lens group G3, the lens closest to the image plane and having the 20th surface and the 21th surface is a convex lens GpH in the present invention (see Table 1). Further, the lens, included in the third lens group, that has the 17th surface and the 18th surface and constitutes a cemented lens; the lens, included in the fourth lens group G4, that is closest to the object in the group and has the 22th surface and the 23th surface; the lens that has the 24th surface and the 25th surface and constitutes a cemented lens; and the lens that has the 28th surface and the 29th surface and constitutes a cemented lens are convex lenses GpL in the present invention (see Table 1).

In the drawings, "S" represents an aperture stop, and "I" represents an image plane, specifically, the imaging surface of a solid-state imaging device, such as a CCD sensor or a CMOS sensor, or the film surface of a silver-salt film, for example. The detailed lens configuration of each lens group is as shown in FIG. 1. It should be noted that the description of these reference numerals, which represent the same components in the drawings related to Examples 2 to 9, will be omitted below.

(2) Typical Numerical Values

Explanation will now be given of Typical numerical value 1 of the zoom lens to which specific numerical values are applied. Table 1 shows lens data related to the zoom lens. In Table 1, "No." shows the order of a lens surface from the object side, "R" shows the curvature radius of the lens surface, "D" shows the interval between lens surfaces on the optical axis, "Nd" shows a refractive index related to a d-line (wavelength λ=587.56 nm), and "vd" shows an Abbe constant related to the d-line (wavelength λ=587.60 nm). In addition, an aperture stop (aperture S) is denoted by a surface number followed by "STOP". Further, a lens surface, which is aspherical, is denoted by a surface number followed by "ASPH", and is expressed with a paraxial curvature radius in the field of curvature radius R.

For an aspherical surface, the aspherical factor and the conic constant used to represent its shape in the following expression are shown in Table 2. An aspherical surface is defined by the following expression.

$$z = ch^2/[1+\{1-(1+k)c^2h^2\}^{1/2}] + A4h^4 + A6h^6 + A8h^8 + A10h^{10} + A12h^{12} + A14h^{14} + A16h^{16} + A18h^{18} + A20h^{20}$$

Here, c is a curvature (1/r), h is the height from the optical axis, k is the conic constant, and A4, A6, A8, A10, A12, A14, A16, A18, and A20 are the aspherical factors of the respective orders.

Table 3 shows the F number (Fno) of the zoom lens having each focal length (F), half image viewing angle (W), and the lens interval between movable group which moves during changing focal length and the adjacent lens group on its image side.

It should be noted that the matters related these tables are the same in the tables shown in Examples 2 to 9, and their description will therefore be omitted below.

Figure 2:
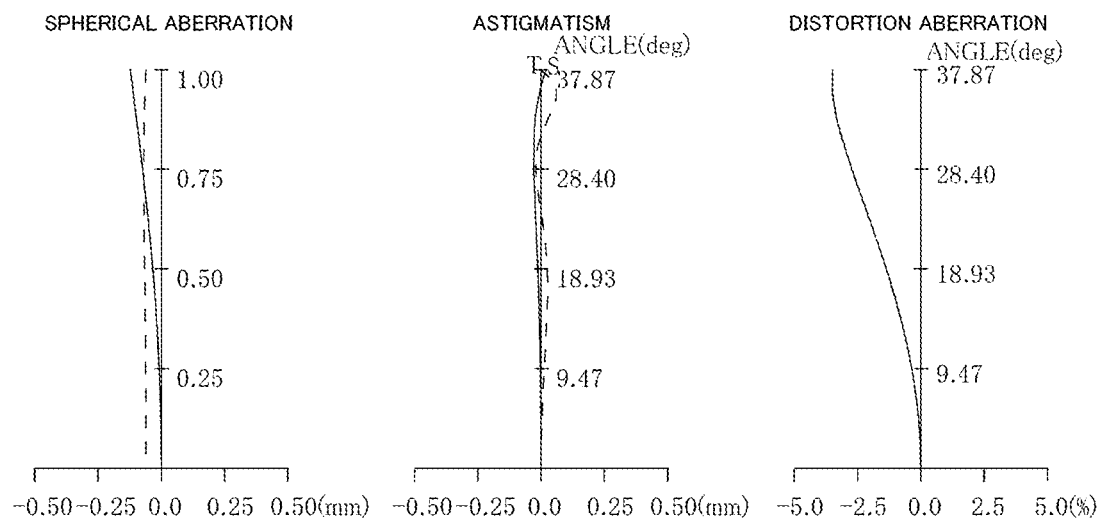
FIG. 2 shows a spherical aberration diagram, an astigmatism diagram, and a distortion aberration diagram of the zoom lens of Example 1 at a time of focusing to infinity at the wide angle end.
Figure 3:
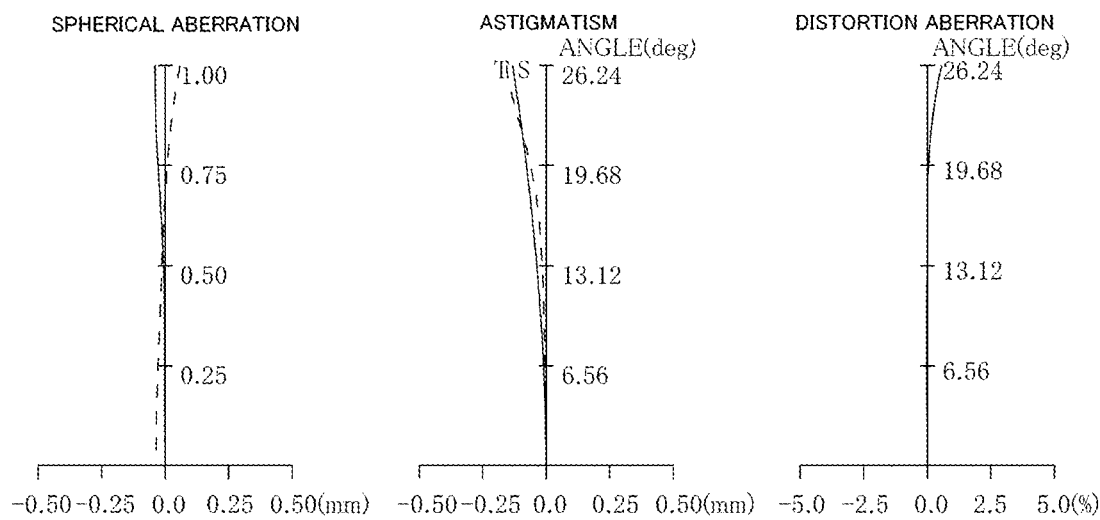
FIG. 3 shows a spherical aberration diagram, an astigmatism diagram, and a distortion aberration diagram of the zoom lens of Example 1 at a time of focusing to infinity at an intermediate focal length.
Figure 4:
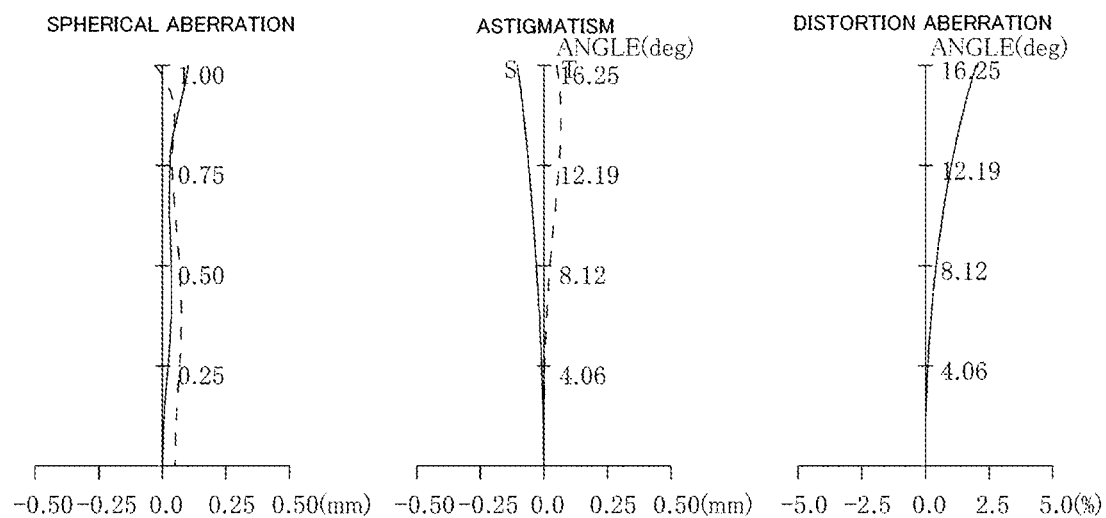
FIG. 4 shows a spherical aberration diagram, an astigmatism diagram, and a distortion aberration diagram of the zoom lens of Example 1 at a time of focusing to infinity at the telephoto end.

FIGS. 2 to 4 shows longitudinal aberrations diagrams of the zoom lens at a time of focusing to infinity at the wide angle end, the middle focal length, and the telephoto end, respectively. Each diagram of a longitudinal aberration shows, from the left, spherical aberration, astigmatism, and distortion aberration. In each diagram of spherical aberration, the vertical axis represents a proportion to a maximum aperture, the horizontal axis represents defocus, and the solid line represents a d-line (587.56 nm), and the dashed line represents a g-line (435.84 nm). In each diagram of an astigmatism, the vertical axis represents an image viewing angle, the horizontal axis represents defocus, and the solid line represents the sagittal direction (S) of a d-line, and the dashed line represents the meridional direction (T) of the d-line. In each diagram of distortion aberration, the vertical axis represents an image viewing angle, and the horizontal axis represents a percentage. It should be noted that the order of presentation of aberrations and what the solid line, the dotted line, and the like represent in each diagram are the same in the diagrams shown in Examples 2 to 9, and their description will therefore be omitted below.

The focal lengths (f1, f2, f3, and f4) of the respective lens groups are shown in Table 28. Table 28 also shows the value of the conditional expression (4) "hGpH/hStop", and the value of the conditional expression (5) "f1/fw". See Table 1 for values related to the conditional expressions (1) to (3), and see Table 3 for values related to the conditional expression (6).

TABLE 1

| No. | R | D | Nd | v d |
|---|---|---|---|---|
| 1 | 206.25950 | 0.80000 | 1.92286 | 20.88 |
| 2 | 105.47640 | 4.62240 | 1.61800 | 63.39 |
| 3 | 552.16740 | 0.20000 | | |
| 4 | 52.61360 | 5.73810 | 1.69680 | 55.46 |
| 5 | 123.90690 | D(5) | | |
| 6 ASPH | 115.83650 | 0.30000 | 1.51460 | 49.96 |
| 7 | 72.77880 | 1.00000 | 1.72916 | 54.67 |
| 8 | 16.84340 | 6.54830 | | |
| 9 | −45.90970 | 0.80000 | 1.60562 | 43.71 |
| 10 | 21.65710 | 5.56360 | 1.76182 | 26.61 |
| 11 | −92.36210 | 5.83950 | | |
| 12 | −17.86200 | 0.80000 | 1.69680 | 55.46 |
| 13 | −28.02270 | 0.20000 | 1.51460 | 49.96 |
| 14 ASPH | −28.02270 | D(14) | | |
| 15 STOP | ∞ | 1.00000 | | |
| 16 | 53.23810 | 0.80000 | 1.92286 | 20.88 |
| 17 | 35.22620 | 10.79820 | 1.49700 | 81.61 |
| 18 | −19.68920 | 0.80000 | 1.80420 | 46.50 |
| 19 | −50.65210 | 0.69150 | | |
| 20 | 198.35320 | 2.66540 | 1.92286 | 20.88 |
| 21 | −165.94390 | D(21) | | |
| 22 | 40.15550 | 8.40400 | 1.59349 | 67.00 |
| 23 | −55.92290 | 0.20000 | | |
| 24 | −112.46930 | 5.17930 | 1.49700 | 81.61 |
| 25 | −31.92030 | 0.80000 | 1.90366 | 31.31 |
| 26 | −62.31770 | 0.20000 | | |
| 27 | 30.82620 | 2.17370 | 1.80420 | 46.50 |
| 28 | 16.56920 | 5.86980 | 1.49700 | 81.61 |
| 29 | 35.13670 | 5.09950 | | |
| 30 ASPH | −216.67320 | 0.20000 | 1.51460 | 49.96 |
| 31 | −99.71870 | 1.00000 | 1.48749 | 70.44 |
| 32 | −2145.44910 | D(32) | | |
| 33 | ∞ | 2.00000 | 1.51680 | 64.20 |
| 34 | ∞ | 1.00000 | | |

TABLE 2

| No. | K | A4 | A6 | A8 | A10 |
|---|---|---|---|---|---|
| 6 | 0.00000E+00 | 1.14541E−05 | −5.91316E−09 | 4.63776E−11 | −1.69037E−13 |
| 14 | 0.00000E+00 | −4.10185E−06 | −1.71684E−08 | 3.67008E−11 | −1.96302E−13 |
| 30 | 0.00000E+00 | −1.94448E−05 | −1.78252E−08 | −3.07457E−12 | −2.25995E−13 |

| No. | A12 | A14 | A16 | A18 | A20 |
|---|---|---|---|---|---|
| 6 | 5.02394E−16 | 0.00000E+00 | 0.00000E+00 | 0.00000E+00 | 0.00000E+00 |
| 14 | 0.00000E+00 | 0.00000E+00 | 0.00000E+00 | 0.00000E+00 | 0.00000E+00 |
| 30 | 0.00000E+00 | 0.00000E+00 | 0.00000E+00 | 0.00000E+00 | 0.00000E+00 |

TABLE 3

| F | 28.8580 | 43.6467 | 72.7337 |
|---|---|---|---|
| Fno | 2.9232 | 2.9123 | 2.9230 |
| W | 37.8658 | 26.2400 | 16.2477 |
| D(5) | 3.4612 | 15.4239 | 32.0740 |
| D(14) | 12.8313 | 6.2213 | 0.5029 |
| D(21) | 6.6361 | 2.6888 | 0.5000 |
| D(32) | 35.7783 | 45.4571 | 57.6298 |

Example 2

(1) Configuration of Optical System

Figure 5:
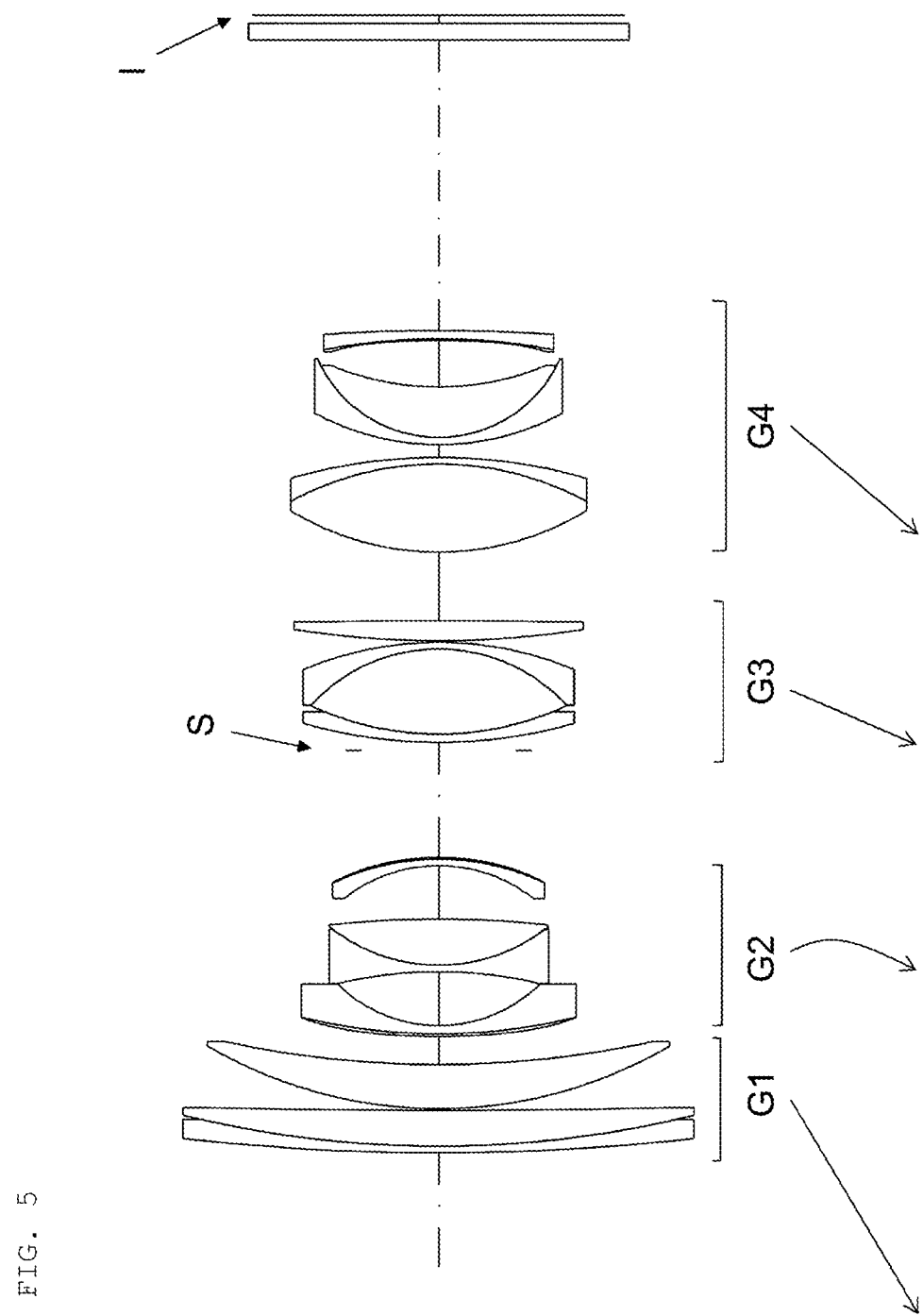
FIG. 5 is a cross-sectional view of a lens configuration example of a zoom lens of Example 2 of the present invention at a time of focusing to infinity at the wide angle end.
Figure 6:
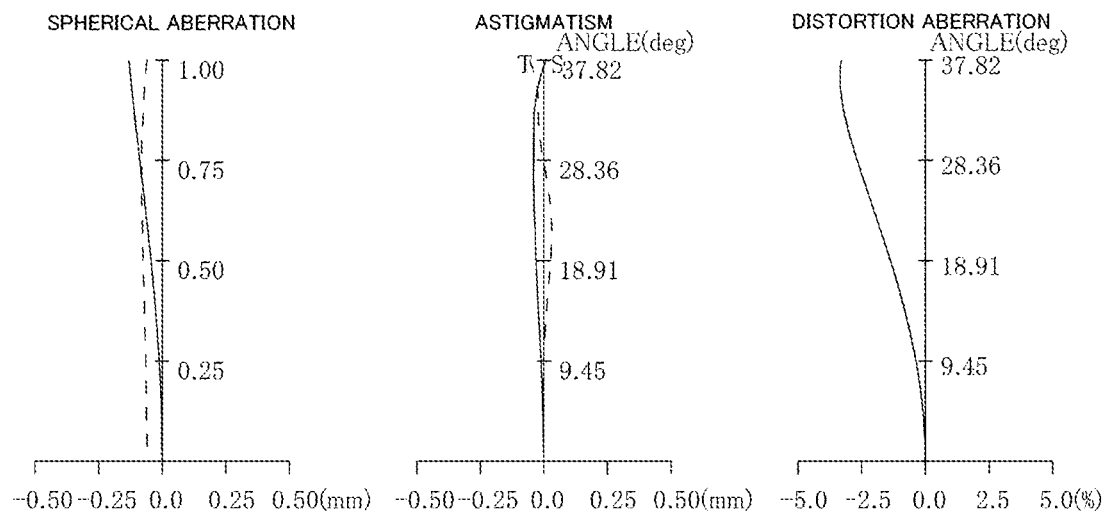
FIG. 6 shows a spherical aberration diagram, an astigmatism diagram, and a distortion aberration diagram of the zoom lens of Example 2 at a time of focusing to infinity at the wide angle end.
Figure 7:
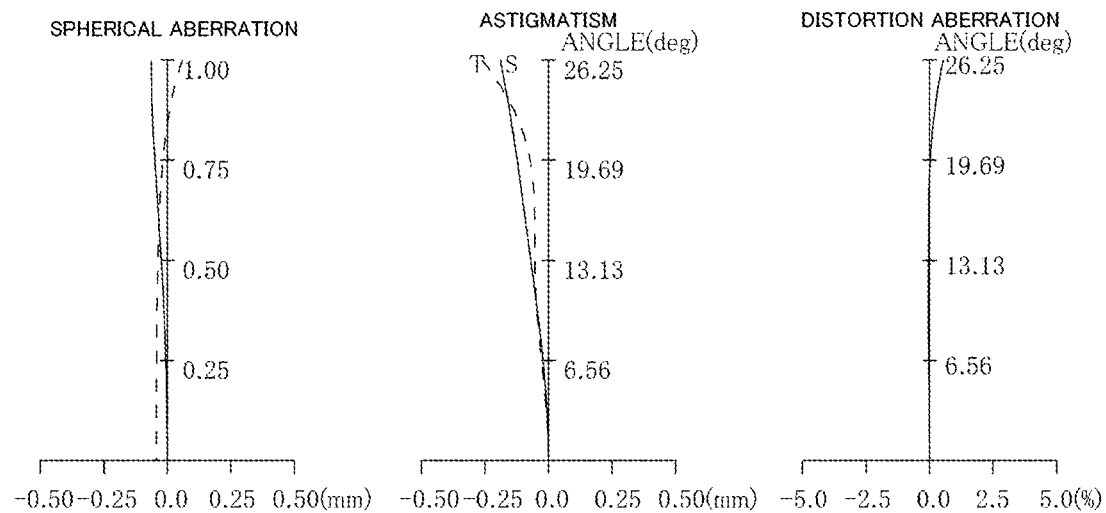
FIG. 7 shows a spherical aberration diagram, an astigmatism diagram, and a distortion aberration diagram of the zoom lens of Example 2 at a time of focusing to infinity at an intermediate focal length.
Figure 8:
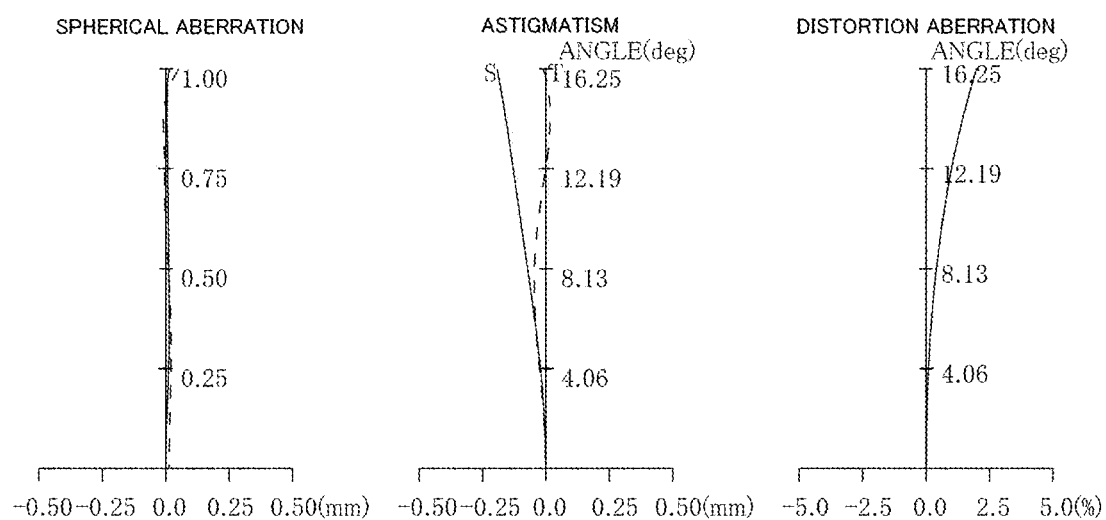
FIG. 8 shows a spherical aberration diagram, an astigmatism diagram, and a distortion aberration diagram of the zoom lens of Example 2 at a time of focusing to infinity at the telephoto end.

FIG. 5 is a cross-sectional view of a lens configuration example of a zoom lens of Example 2 of the present invention. The zoom lens consists of, in order from the object side, a first lens group G1 having positive refractive power, a second lens group G2 having negative refractive power, a third lens group G3 having positive refractive power, and a fourth lens group having positive refractive power, and achieves changing focal length by varying the intervals between the lens groups. During changing focal length from the wide angle end to the telephoto end, the first lens group G1 moves toward the object, the second lens group G2 moves toward the object in such a manner that it draws a path protruding toward the image plane, the third lens group G3 moves toward the object, and the fourth lens group G4 moves toward the object. The moving paths of the lens groups are all different.

In the zoom lens of Example 2, the third lens group G3 and the fourth lens group G4 constitute a GR group of the present invention. The 17th surface and the 18th surface included in the third lens group G3, and the 23th surface and the 26th surface included in the fourth lens group G4 are cemented surfaces having negative refractive power in the present invention (see Table 4). In addition, in the third lens group G3, the lens closest to the image plane and having the 20th surface and the 21th surface is a convex lens GpH in the present invention (see Table 4). Further, the lens, included in the third lens group, that has the 17th surface and the 18th surface and constitutes a cemented lens; the lens, included in the fourth lens group G4, that is closest to the object in the group, constitutes a cemented lens, and has the 22th surface and the 23th surface; and the following lens that constitutes a cemented lens and has the 26th surface and the 27th surface are convex lenses GpL in the present invention (see Table 4).

(2) Typical Numerical Values

Explanation will now be given of Typical numerical value 2 of the zoom lens to which specific numerical values are applied. Table 4 shows lens data related to the zoom lens. For an aspherical surface, the aspherical factor and the conic constant are shown in Table 5. Table 6 shows the F number (Fno) of the zoom lens having each focal length (F), the half image viewing angle (W), and the lens interval between movable group which moves during changing focal length and the adjacent lens group on its image side. FIGS. 5 to 8 are longitudinal aberrations diagrams of the zoom lens at a time of focusing to infinity. Table 28 shows the focal lengths (f1, f2, f3, and f4) of the respective lens groups and the values in the conditional expressions (4) and (5). See Table 4 for values related to the conditional expressions (1) to (3), and see Table 6 for values related to the conditional expression (6).

TABLE 4

| No. | R | D | Nd | v d |
|---|---|---|---|---|
| 1 | 273.7418 | 0.8000 | 1.92286 | 20.88 |
| 2 | 127.6778 | 4.3414 | 1.61800 | 63.39 |
| 3 | 1159.8271 | 0.2000 | | |
| 4 | 54.6742 | 5.3540 | 1.69680 | 55.46 |

TABLE 4-continued

| No. | R | D | Nd | v d |
|---|---|---|---|---|
| 5 | 120.5502 | D(5) | | |
| 6ASPH | 92.7077 | 0.3000 | 1.51460 | 49.96 |
| 7 | 68.4825 | 1.0000 | 1.72916 | 54.67 |
| 8 | 17.2217 | 6.5362 | | |
| 9 | −52.3680 | 0.8000 | 1.60562 | 43.71 |
| 10 | 20.8717 | 5.5815 | 1.76182 | 26.61 |
| 11 | −123.0575 | 6.4748 | | |
| 12 | −18.2473 | 0.8000 | 1.69680 | 55.46 |
| 13 | −29.4806 | 0.2000 | 1.51460 | 49.96 |
| 14ASPH | −29.4806 | D(14) | | |
| 15STOP | ∞ | 1.0000 | | |
| 16 | 58.9832 | 1.0000 | 1.92286 | 20.88 |
| 17 | 36.2082 | 10.3244 | 1.49700 | 81.61 |
| 18 | −20.6322 | 0.8000 | 1.80420 | 46.50 |
| 19 | −41.7816 | 0.2000 | | |
| 20 | 110.8326 | 2.3985 | 1.92286 | 20.88 |
| 21 | −1243.0628 | D(21) | | |
| 22 | 34.0190 | 10.6864 | 1.59282 | 68.62 |
| 23 | −37.3010 | 0.8000 | 1.90366 | 31.31 |
| 24 | −63.6616 | 1.5540 | | |
| 25 | 31.0017 | 0.8753 | 1.80420 | 46.50 |
| 26 | 15.9071 | 6.1139 | 1.49700 | 81.61 |
| 27 | 33.4745 | 5.6357 | | |
| 28ASPH | −122.8934 | 0.2000 | 1.51460 | 49.96 |
| 29 | −72.3046 | 1.0000 | 1.48749 | 70.44 |
| 30 | −206.0011 | D(30) | | |
| 31 | ∞ | 2.0000 | 1.51680 | 64.20 |
| 32 | ∞ | 1.0000 | | |

TABLE 5

| No. | K | A4 | A6 | A8 | A10 |
|---|---|---|---|---|---|
| 6 | 0.00000E+00 | 9.21610E−06 | −1.61619E−10 | 2.55874E−11 | −9.47994E−14 |
| 14 | 0.00000E+00 | −3.65150E−06 | −1.82836E−08 | 7.95403E−11 | −3.10116E−13 |
| 28 | 0.00000E+00 | −1.91716E−05 | −3.37346E−08 | 9.83411E−11 | −6.77413E−13 |

| No. | A12 | A14 | A16 | A18 | A20 |
|---|---|---|---|---|---|
| 6 | 3.34149E−16 | 0.00000E+00 | 0.00000E+00 | 0.00000E+00 | 0.00000E+00 |
| 14 | 0.00000E+00 | 0.00000E+00 | 0.00000E+00 | 0.00000E+00 | 0.00000E+00 |
| 28 | 0.00000E+00 | 0.00000E+00 | 0.00000E+00 | 0.00000E+00 | 0.00000E+00 |

TABLE 6

| F | 28.8615 | 43.6453 | 72.7476 |
|---|---|---|---|
| Fno | 2.9003 | 2.916 | 2.912 |
| W | 37.8151 | 26.2524 | 16.2527 |
| D(5) | 3.4266 | 13.8084 | 34.878 |
| D(14) | 12.9613 | 5.7232 | 0.5004 |
| D(21) | 8.3455 | 3.4872 | 1.1191 |
| D(30) | 35.3233 | 46.5242 | 57.5264 |

Example 3

(1) Configuration of Optical System

Figure 9:
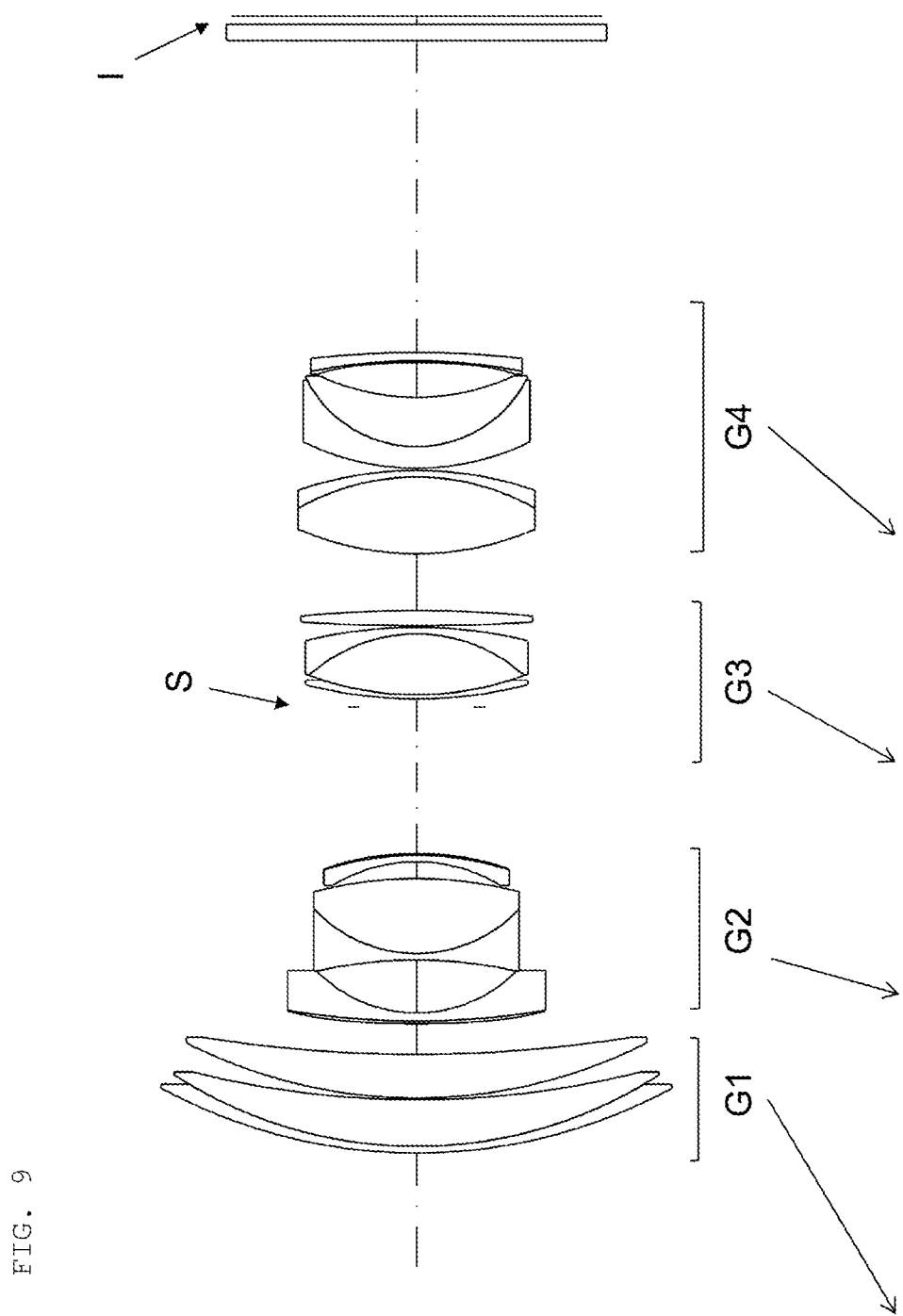
FIG. 9 is a cross-sectional view of a lens configuration example of a zoom lens of Example 3 of the present invention at a time of focusing to infinity at the wide angle end.

FIG. 9 is a cross-sectional view of a lens configuration example of a zoom lens of Example 3 of the present invention. The zoom lens consists of, in order from the object side, a first lens group G1 having positive refractive power, a second lens group G2 having negative refractive power, a third lens group G3 having positive refractive power, and a fourth lens group having positive refractive power, and achieves changing focal length by varying the intervals between the lens groups. During changing focal length from the wide angle end to the telephoto end, the first lens group G1 to the fourth lens group G4 follow different paths to move toward the object.

In the zoom lens of Example 3, the third lens group G3 and the fourth lens group G4 constitute a GR group of the present invention. The 17th surface and the 18th surface included in the third lens group G3, and the 23th surface and the 26th surface included in the fourth lens group G4 are cemented surfaces having negative refractive power in the present invention (see Table 7). In addition, in the third lens group G3, the lens closest to the image plane and having the 20th surface and the 21th surface is a convex lens GpH in the present invention (see Table 7). Further, the lens, included in the third lens group, that has the 17th surface and the 18th surface and constitutes a cemented lens; the lens, included in the fourth lens group G4, that is closest to the object in the group, constitutes a cemented lens, and has the 22th surface and the 23th surface; and the following lens that constitutes a cemented lens and has the 26th surface and the 27th surface are convex lenses GpL in the present invention (see Table 7).

(2) Typical Numerical Values

Figure 10:
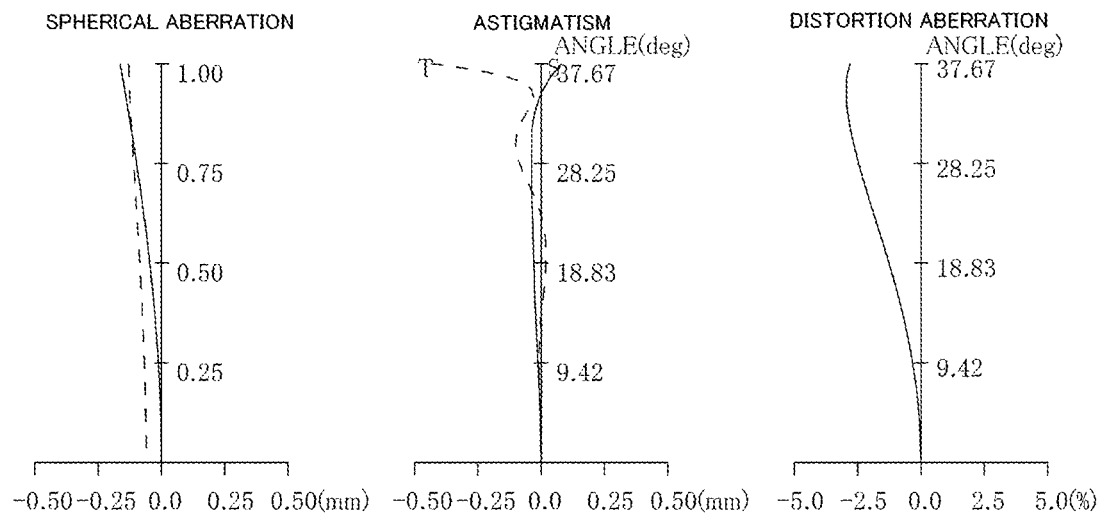
FIG. 10 shows a spherical aberration diagram, an astigmatism diagram, and a distortion aberration diagram of the zoom lens of Example 3 at a time of focusing to infinity at the wide angle end.
Figure 11:
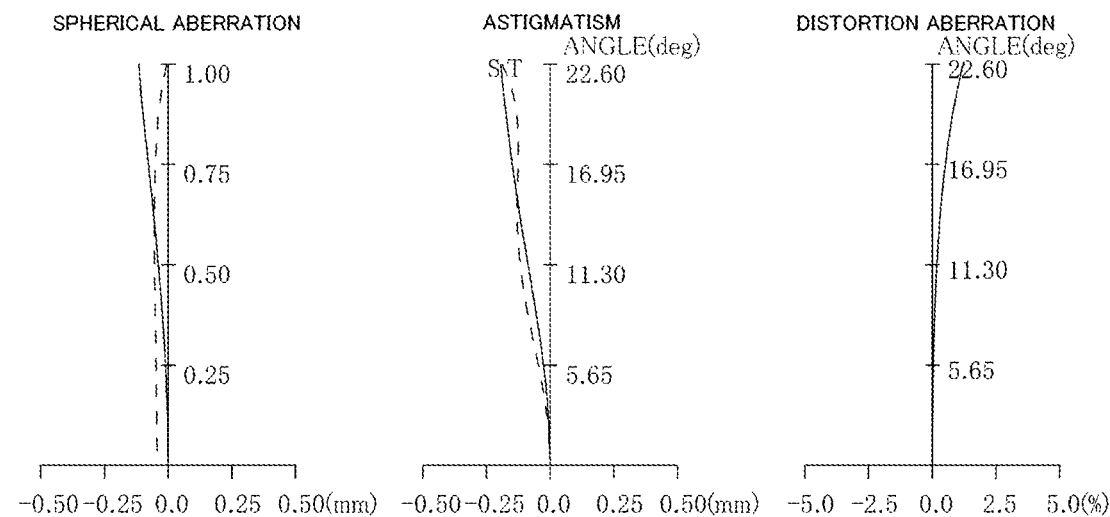
FIG. 11 shows a spherical aberration diagram, an astigmatism diagram, and a distortion aberration diagram of the zoom lens of Example 3 at a time of focusing to infinity at an intermediate focal length.
Figure 12:
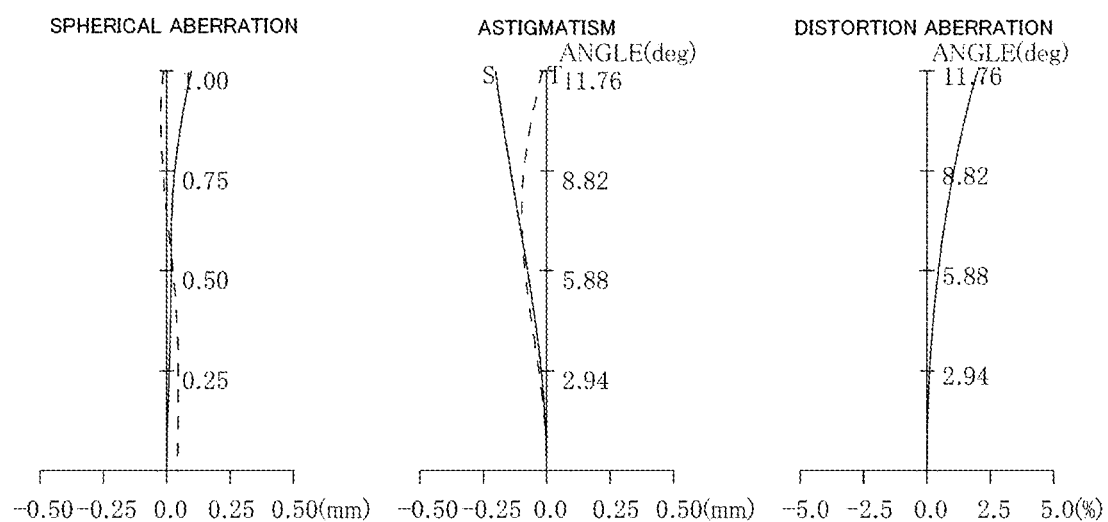
FIG. 12 shows a spherical aberration diagram, an astigmatism diagram, and a distortion aberration diagram of the zoom lens of Example 3 at a time of focusing to infinity at the telephoto end.

Explanation will now be given of Typical numerical value 3 of the zoom lens to which specific numerical values are applied. Table 7 shows lens data related to the zoom lens. For an aspherical surface, the aspherical factor and the conic constant are shown in Table 8. Table 9 shows the F number (Fno) of the zoom lens having each focal length (F), the half image viewing angle (W), and the lens interval between each lens group (movable group) from the adjacent lens group on its image side moving during changing focal length. FIGS. 10 to 12 are longitudinal aberrations diagrams of the zoom lens at a time of focusing to infinity. Table 28 shows the focal lengths (f1, f2, f3, and f4) of the respective lens groups and the values in the conditional expressions (4) and (5). See Table 7 for values related to the conditional expressions (1) to (3), and see Table 9 for values related to the conditional expression (6).

TABLE 7

| No. | R | D | Nd | v d |
|---|---|---|---|---|
| 1 | 63.8944 | 0.8000 | 1.92286 | 20.88 |
| 2 | 53.2990 | 5.6825 | 1.49700 | 81.61 |
| 3 | 110.1485 | 0.2000 | | |
| 4 | 60.6681 | 5.3003 | 1.59282 | 68.62 |
| 5 | 161.1727 | D(5) | | |
| 6ASPH | 141.3391 | 0.3000 | 1.51460 | 49.96 |
| 7 | 92.6708 | 1.0000 | 1.72916 | 54.67 |
| 8 | 16.7772 | 6.4186 | | |
| 9 | −54.3686 | 0.8000 | 1.56883 | 56.36 |
| 10 | 16.8054 | 9.0993 | 1.64769 | 33.84 |
| 11 | −47.8220 | 2.0378 | | |
| 12 | −19.1205 | 0.8000 | 1.72916 | 54.67 |
| 13 | −35.5757 | 0.2000 | 1.51460 | 49.96 |
| 14ASPH | −35.5757 | D(14) | | |
| 15STOP | ∞ | 1.0000 | | |

TABLE 7-continued

| No. | R | D | Nd | v d |
|---|---|---|---|---|
| 16 | 52.8451 | 0.5000 | 1.92286 | 20.88 |
| 17 | 36.9595 | 7.3993 | 1.49700 | 81.61 |
| 18 | −19.0480 | 0.8000 | 1.80420 | 46.5 |
| 19 | −56.1874 | 0.2000 | | |
| 20 | 218.0432 | 1.8427 | 1.92286 | 20.88 |
| 21 | −144.3735 | D(21) | | |
| 22 | 35.4970 | 9.3247 | 1.59282 | 68.62 |
| 23 | −28.6508 | 0.8000 | 2.00100 | 29.13 |
| 24 | −43.0595 | 0.2712 | | |
| 25 | 30.6853 | 2.6206 | 1.77250 | 49.62 |
| 26 | 14.7798 | 5.9929 | 1.49700 | 81.61 |
| 27 | 27.6085 | 4.2215 | | |
| 28ASPH | −83.8550 | 0.2000 | 1.51460 | 49.96 |
| 29 | −63.8146 | 1.0000 | 1.48749 | 70.44 |
| 30 | −117.1399 | D(30) | | |
| 31 | ∞ | 2.0000 | 1.51680 | 64.2 |
| 32 | ∞ | 1.0000 | | |

TABLE 8

| No. | K | A4 | A6 | A8 | A10 |
|---|---|---|---|---|---|
| 6 | 0.00000E+00 | 1.18407E−05 | −1.63549E−08 | 1.63556E−10 | −6.83717E−13 |
| 14 | 0.00000E+00 | −6.38264E−06 | −1.92562E−08 | 1.14299E−10 | −3.95171E−13 |
| 28 | 0.00000E+00 | −2.15995E−05 | −4.67680E−08 | 1.32958E−10 | −1.32141E−12 |

| No. | A12 | A14 | A16 | A18 | A20 |
|---|---|---|---|---|---|
| 6 | 1.38615E−15 | 0.00000E+00 | 0.00000E+00 | 0.00000E+00 | 0.00000E+00 |
| 14 | 0.00000E+00 | 0.00000E+00 | 0.00000E+00 | 0.00000E+00 | 0.00000E+00 |
| 28 | 0.00000E+00 | 0.00000E+00 | 0.00000E+00 | 0.00000E+00 | 0.00000E+00 |

TABLE 9

| F | 28.8722 | 51.3877 | 101.8262 |
|---|---|---|---|
| Fno | 4.1094 | 4.0957 | 4.1517 |
| W | 37.6670 | 22.5987 | 11.7613 |
| D(5) | 3.7447 | 17.1253 | 39.5947 |
| D(14) | 17.7933 | 7.6993 | 0.5028 |
| D(21) | 6.8854 | 2.3225 | 0.5000 |
| D(30) | 37.9586 | 53.3945 | 70.5912 |

Example 4

(1) Configuration of Optical System

Figure 13:
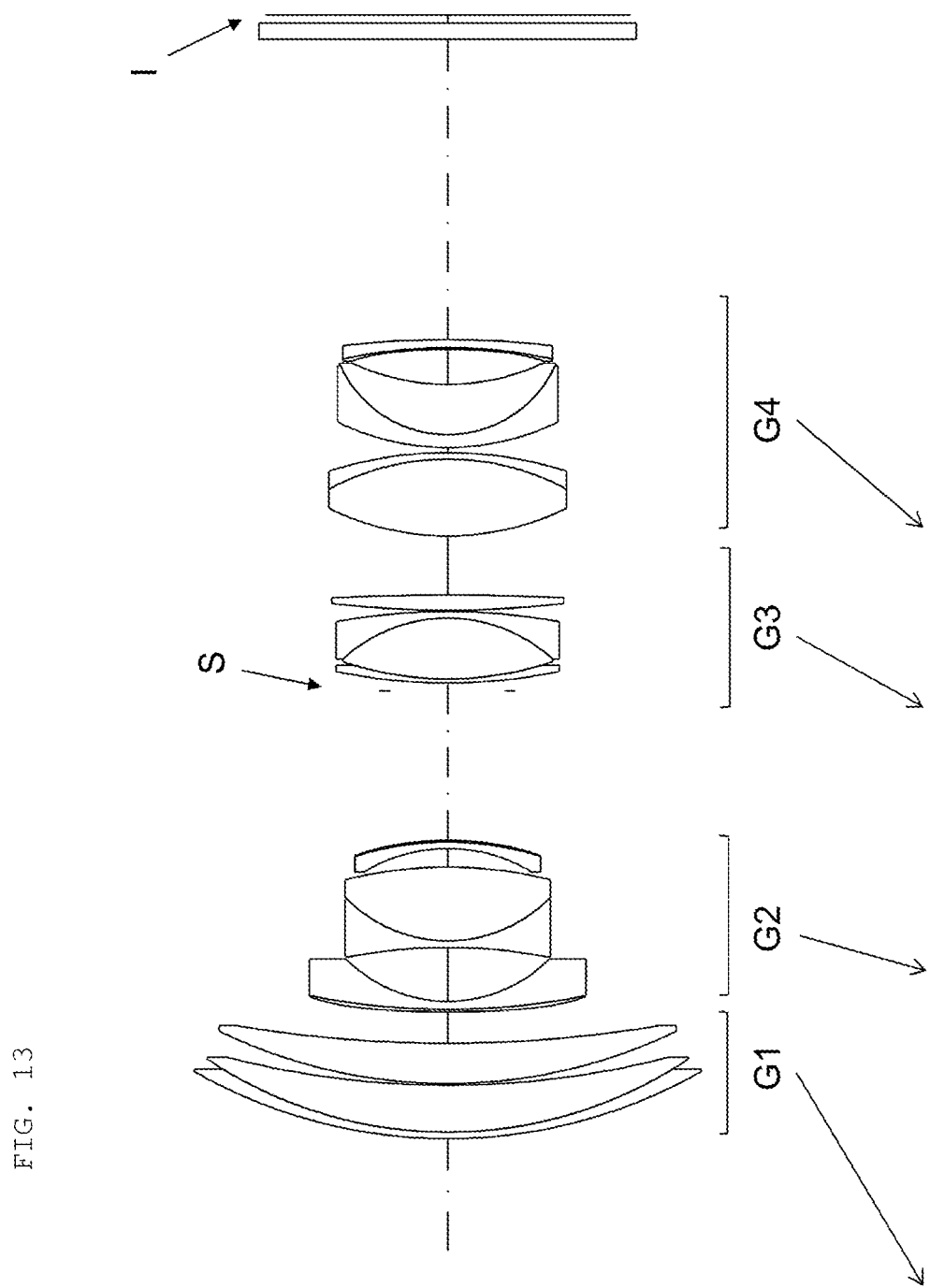
FIG. 13 is a cross-sectional view of a lens configuration example of a zoom lens of Example 4 of the present invention at a time of focusing to infinity at the wide angle end.

FIG. 13 is a cross-sectional view of a lens configuration example of a zoom lens of Example 4 of the present invention. The zoom lens consists of, in order from the object side, a first lens group G1 having positive refractive power, a second lens group G2 having negative refractive power, a third lens group G3 having positive refractive power, and a fourth lens group having positive refractive power, and achieves changing focal length by varying the intervals between the lens groups. During changing focal length from the wide angle end to the telephoto end, the first lens group G1 to the fourth lens group G4 follow different paths to move toward the object.

In the zoom lens of Example 4, the third lens group G3 and the fourth lens group G4 constitute a GR group of the present invention. The 17th surface and the 18th surface included in the third lens group G3, and the 23th surface and the 26th surface included in the fourth lens group G4 are cemented surfaces having negative refractive power in the present invention (see Table 10). In addition, in the third lens group G3, the lens closest to the image plane and having the 20th surface and the 21th surface is a convex lens GpH in the present invention (see Table 10). Further, the lens, included in the third lens group, that has the 17th surface and the 18th surface and constitutes a cemented lens; the lens, included in the fourth lens group G4, that is closest to the object in the group, constitutes a cemented lens, and has the 22th surface and the 23th surface; and the following lens that constitutes a cemented lens and has the 26th surface and the 27th surface are convex lenses GpL in the present invention (see Table 10).

(2) Typical Numerical Values

Figure 14:
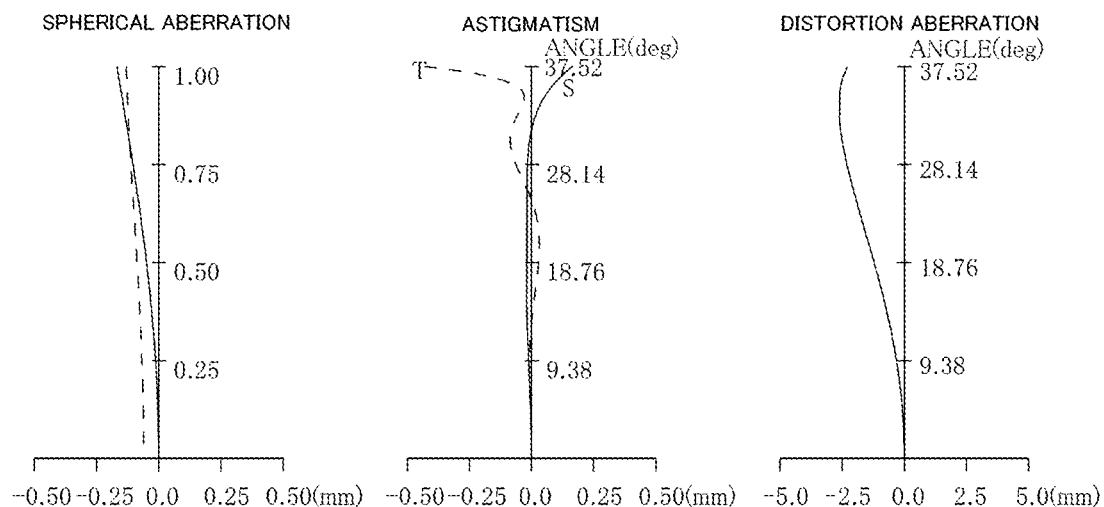
FIG. 14 shows a spherical aberration diagram, an astigmatism diagram, and a distortion aberration diagram of the zoom lens of Example 4 at a time of focusing to infinity at the wide angle end.
Figure 15:
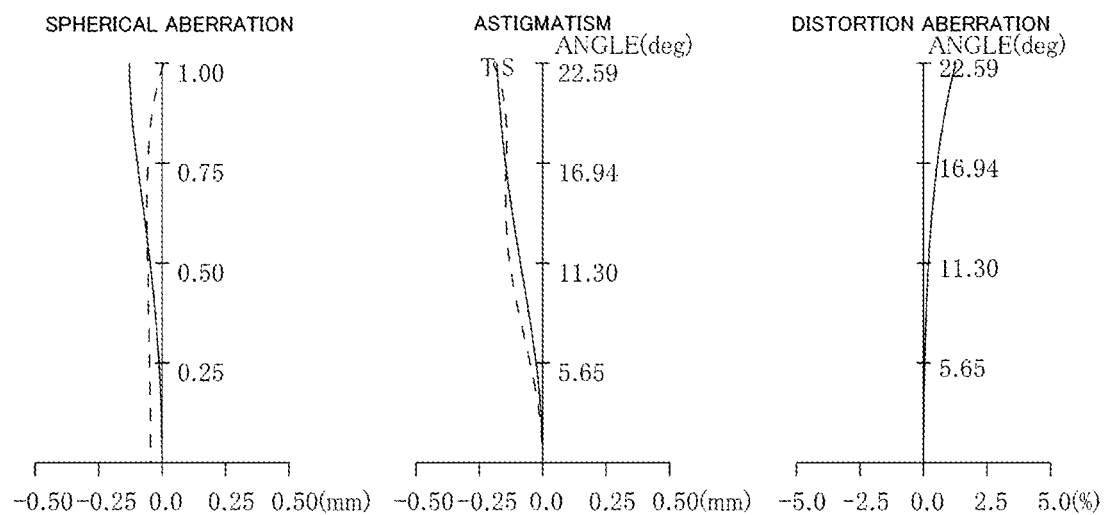
FIG. 15 shows a spherical aberration diagram, an astigmatism diagram, and a distortion aberration diagram of the zoom lens of Example 4 at a time of focusing to infinity at an intermediate focal length.
Figure 16:
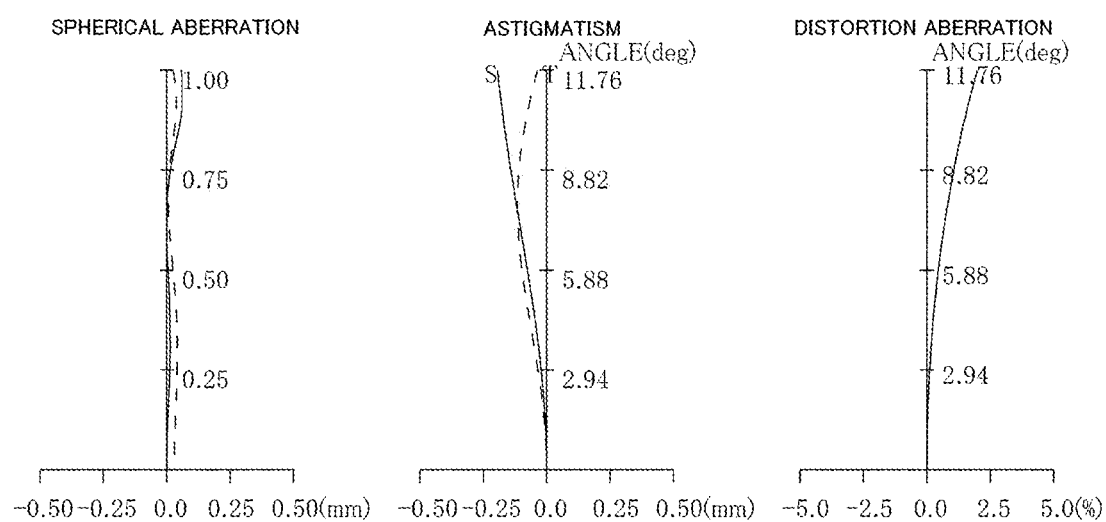
FIG. 16 shows a spherical aberration diagram, an astigmatism diagram, and a distortion aberration diagram of the zoom lens of Example 4 at a time of focusing to infinity at the telephoto end.

Explanation will now be given of Typical numerical value 4 of the zoom lens to which specific numerical values are applied. Table 10 shows lens data related to the zoom lens. For an aspherical surface, the aspherical factor and the conic constant are shown in Table 11. Table 12 shows the F number (Fno) of the zoom lens having each focal length (F), the half image viewing angle (W), and the lens interval between movable group which moves during changing focal length and the adjacent lens group on its image side. FIGS. 14 to 16 are longitudinal aberrations diagrams of the zoom lens at a time of focusing to infinity. Table 28 shows the focal lengths (f1, f2, f3, and f4) of the respective lens groups and the values in the conditional expressions (4) and (5). See Table 10 for values related to the conditional expressions (1) to (3), and see Table 12 for values related to the conditional expression (6).

TABLE 10

| No. | R | D | Nd | v d |
|---|---|---|---|---|
| 1 | 61.5786 | 0.8000 | 1.92286 | 20.88 |
| 2 | 52.0510 | 5.7399 | 1.49700 | 81.61 |
| 3 | 106.4012 | 0.2000 | | |
| 4 | 63.0821 | 4.9356 | 1.59282 | 68.62 |
| 5 | 153.2269 | D(5) | | |
| 6ASPH | 155.9684 | 0.3000 | 1.51460 | 49.96 |
| 7 | 83.7613 | 1.0000 | 1.72916 | 54.67 |
| 8 | 17.1990 | 6.6068 | | |
| 9 | −61.2404 | 0.8000 | 1.56883 | 56.36 |
| 10 | 17.1285 | 9.0362 | 1.64769 | 33.84 |
| 11 | −49.9502 | 2.2606 | | |
| 12 | −19.4312 | 0.8000 | 1.72916 | 54.67 |
| 13 | −36.8713 | 0.2000 | 1.51460 | 49.96 |
| 14ASPH | −36.8713 | D(14) | | |
| 15STOP | ∞ | 1.0000 | | |
| 16 | 65.5383 | 0.5000 | 1.94595 | 17.98 |
| 17 | 39.3437 | 7.4492 | 1.59349 | 67.00 |
| 18 | −18.5719 | 0.8000 | 1.80420 | 46.50 |
| 19 | −74.4273 | 0.2000 | | |
| 20 | 126.2989 | 1.8161 | 1.94595 | 17.98 |
| 21 | −303.2145 | D(21) | | |
| 22 | 32.3007 | 9.3998 | 1.59282 | 68.62 |
| 23 | −30.0473 | 0.8000 | 2.00100 | 29.13 |
| 24 | −46.6951 | 0.6219 | | |
| 25 | 30.0832 | 1.5814 | 1.77250 | 49.62 |
| 26 | 14.2447 | 6.1504 | 1.49700 | 81.61 |
| 27 | 27.1131 | 4.2811 | | |

TABLE 10-continued

| No. | R | D | Nd | ν d |
|---|---|---|---|---|
| 28ASPH | −75.1949 | 0.2000 | 1.51460 | 49.96 |
| 29 | −59.0799 | 1.0000 | 1.48749 | 70.44 |
| 30 | −108.1864 | D(30) | | |
| 31 | ∞ | 2.0000 | 1.51680 | 64.20 |
| 32 | ∞ | 1.0000 | | |

TABLE 11

| No. | K | A4 | A6 | A8 | A10 |
|---|---|---|---|---|---|
| 6 | 0.00000E+00 | 1.14500E−05 | −1.48891E−08 | 1.33519E−10 | −5.07198E−13 |
| 14 | 0.00000E+00 | −6.02882E−06 | −2.28893E−08 | 1.67325E−10 | −6.47292E−13 |
| 28 | 0.00000E+00 | −2.18758E−05 | −5.11023E−08 | 1.62336E−10 | −1.56674E−12 |

| No. | A12 | A14 | A16 | A18 | A20 |
|---|---|---|---|---|---|
| 6 | 9.51179E−16 | 0.00000E+00 | 0.00000E+00 | 0.00000E+00 | 0.00000E+00 |
| 14 | 0.00000E+00 | 0.00000E+00 | 0.00000E+00 | 0.00000E+00 | 0.00000E+00 |
| 28 | 0.00000E+00 | 0.00000E+00 | 0.00000E+00 | 0.00000E+00 | 0.00000E+00 |

TABLE 12

| F | 28.8734 | 51.3899 | 101.8139 |
|---|---|---|---|
| Fno | 4.0979 | 4.0767 | 4.1371 |
| W | 37.5234 | 22.5913 | 11.7634 |
| D(5) | 3.8463 | 16.9640 | 40.6476 |
| D(14) | 18.2661 | 7.7430 | 0.5043 |
| D(21) | 7.2468 | 2.3605 | 0.5000 |
| D(30) | 36.8313 | 52.5564 | 69.8694 |

Example 5

(1) Configuration of Optical System

Figure 17:
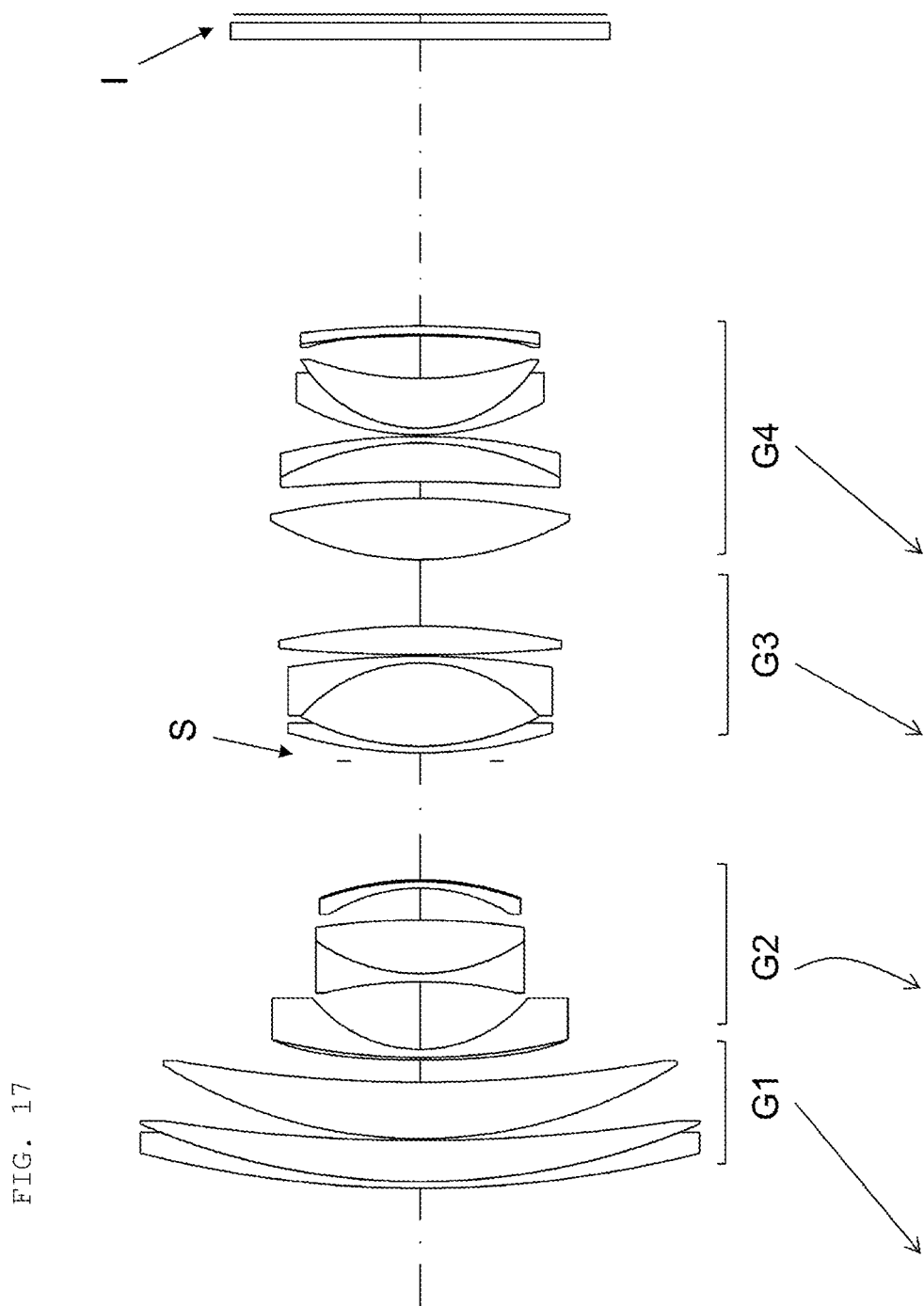
FIG. 17 is a cross-sectional view of a lens configuration example of a zoom lens of Example 5 of the present invention at a time of focusing to infinity at the wide angle end.

FIG. 17 is a cross-sectional view of a lens configuration example of a zoom lens of Example 5 of the present invention. The zoom lens consists of, in order from the object side, a first lens group G1 having positive refractive power, a second lens group G2 having negative refractive power, a third lens group G3 having positive refractive power, and a fourth lens group having positive refractive power, and achieves changing focal length by varying the intervals between the lens groups. During changing focal length from the wide angle end to the telephoto end, the first lens group G1 moves toward the object, the second lens group moves toward the object in such a manner that it draws a path protruding toward the image plane, the third lens group G3 moves toward the object, and the fourth lens group G4 moves toward the object. The moving paths of the lens groups are all different.

In the zoom lens of Example 5, the third lens group G3 and the fourth lens group G4 constitute a GR group of the present invention. The 17th surface and the 18th surface included in the third lens group G3, and the 25th surface and the 28th surface included in the fourth lens group G4 are cemented surfaces having negative refractive power in the present invention (see Table 13). In addition, in the third lens group G3, the lens closest to the image plane and having the 20th surface and the 21th surface is a convex lens GpH in the present invention (see Table 13). Further, the lens, included in the third lens group, that has the 17th face and the 18th face and constitutes a cemented lens; the lens, included in the fourth lens group G4, that is closest to the object in the group and has the 22th face and the 23th face; the following lens that has the 24th face and the 25th face and constitutes a cemented lens; and the lens following farther that has the 28th face and the 29th face and constitutes a cemented lens are convex lenses GpL in the present invention (see Table 13).

(2) Typical Numerical Values

Figure 18:
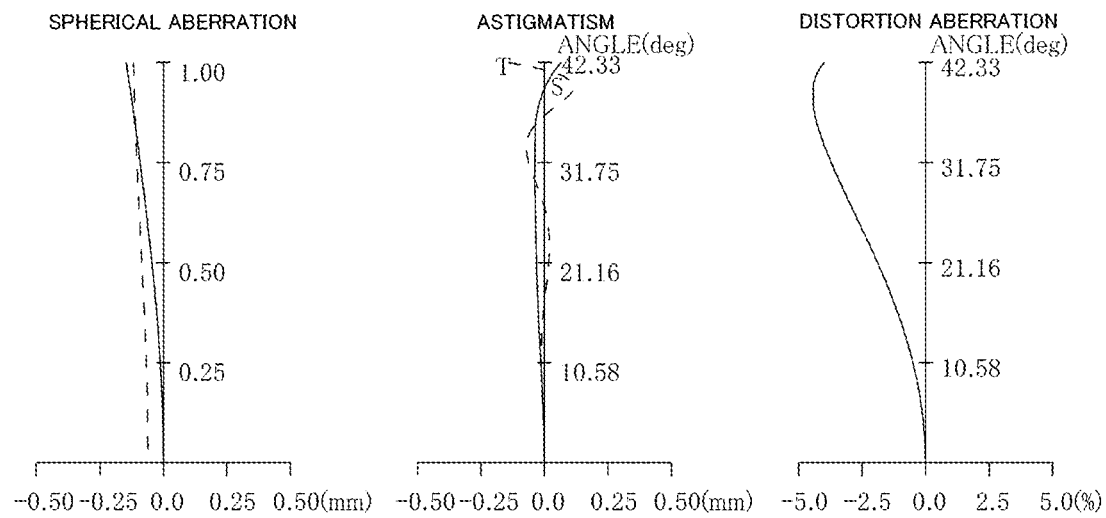
FIG. 18 shows a spherical aberration diagram, an astigmatism diagram, and a distortion aberration diagram of the zoom lens of Example 5 at a time of focusing to infinity at the wide angle end.
Figure 19:
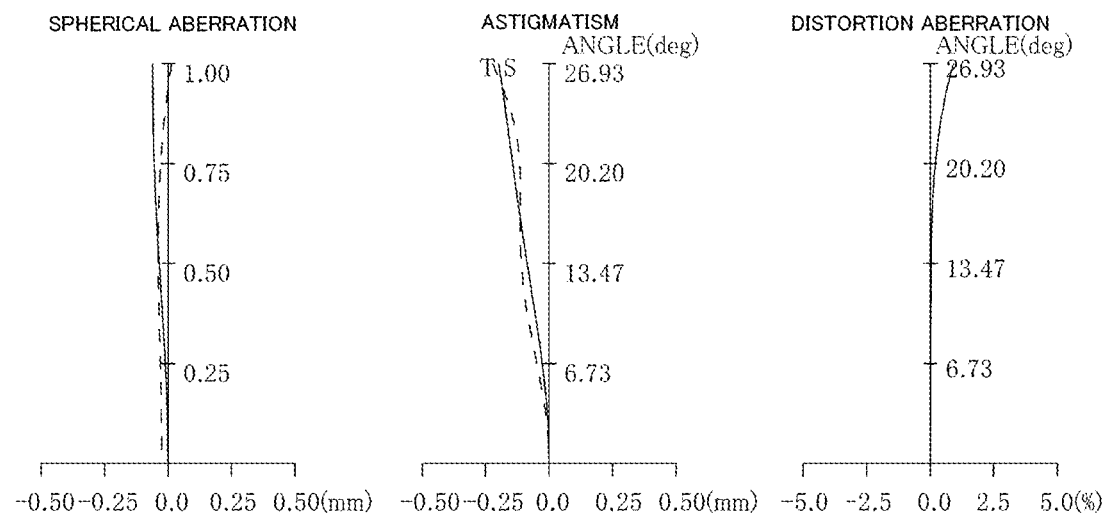
FIG. 19 shows a spherical aberration diagram, an astigmatism diagram, and a distortion aberration diagram of the zoom lens of Example 5 at a time of focusing to infinity at an intermediate focal length.
Figure 20:
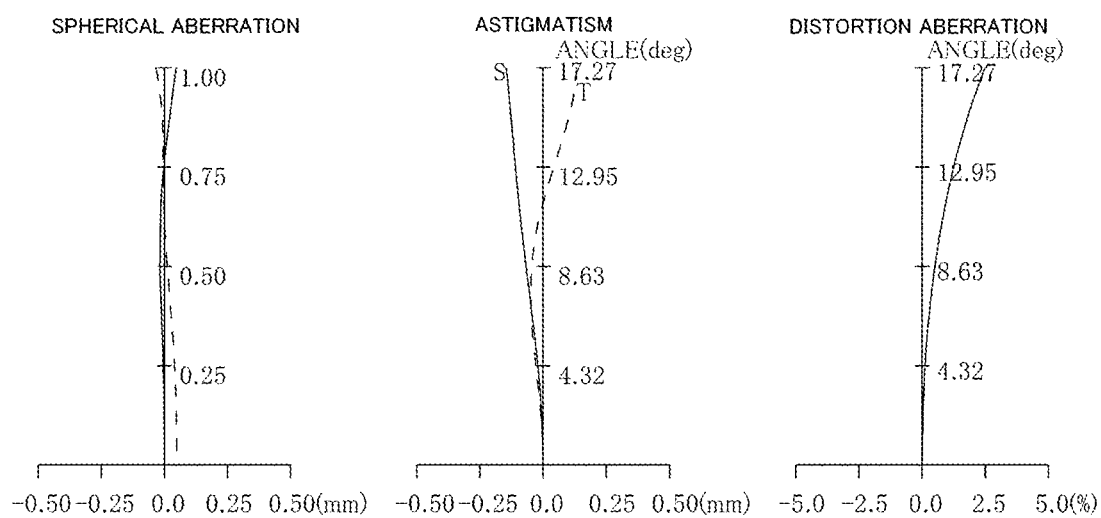
FIG. 20 shows a spherical aberration diagram, an astigmatism diagram, and a distortion aberration diagram of the zoom lens of Example 5 at a time of focusing to infinity at the telephoto end.

Explanation will now be given of Typical numerical value 5 of the zoom lens to which specific numerical values are applied. Table 13 shows lens data related to the zoom lens. For an aspherical surface, the aspherical factor and the conic constant are shown in Table 14. Table 15 shows the F number (Fno) of the zoom lens having each focal length (F), the half image viewing angle (W), and the lens interval between movable group which moves during changing focal length and the adjacent lens group on its image side. FIGS. 18 to 20 are longitudinal aberrations diagrams of the zoom lens at a time of focusing to infinity. Table 28 shows the focal lengths (f1, f2, f3, and f4) of the respective lens groups and the values in the conditional expressions (4) and (5). See Table 13 for values related to the conditional expressions (1) to (3), and see Table 15 for values related to the conditional expression (6).

TABLE 13

| No. | R | D | Nd | ν d |
|---|---|---|---|---|
| 1 | 135.7175 | 0.8000 | 1.92286 | 20.88 |
| 2 | 84.5917 | 5.0219 | 1.61997 | 63.88 |
| 3 | 203.8066 | 0.2000 | | |
| 4 | 57.9825 | 6.8816 | 1.69680 | 55.46 |
| 5 | 167.4220 | D(5) | | |
| 6ASPH | 121.5119 | 0.3000 | 1.51460 | 49.96 |
| 7 | 73.8870 | 1.0000 | 1.72916 | 54.67 |
| 8 | 16.5921 | 8.2341 | | |
| 9 | −49.4155 | 0.9792 | 1.83481 | 42.72 |
| 10 | 21.8307 | 6.5169 | 2.00100 | 29.13 |
| 11 | −89.8329 | 3.8827 | | |
| 12 | −20.4352 | 0.8000 | 1.72916 | 54.67 |
| 13 | −35.2270 | 0.2000 | 1.51460 | 49.96 |
| 14ASPH | −35.2270 | D(14) | | |
| 15STOP | ∞ | 1.0000 | | |
| 16 | 53.0947 | 0.8000 | 1.92286 | 20.88 |
| 17 | 30.7289 | 10.1458 | 1.49700 | 81.61 |
| 18 | −19.1143 | 0.8000 | 1.77250 | 49.62 |
| 19 | −95.5054 | 0.2000 | | |
| 20 | 192.2312 | 3.4715 | 1.92286 | 20.88 |
| 21 | −82.3958 | D(21) | | |
| 22 | 36.6584 | 7.4797 | 1.61997 | 63.88 |
| 23 | −81.9954 | 1.9809 | | |
| 24 | −191.2280 | 4.7303 | 1.49700 | 81.61 |
| 25 | −35.9632 | 0.8000 | 1.92119 | 23.96 |
| 26 | −69.0006 | 0.2000 | | |
| 27 | 30.1487 | 0.8000 | 1.83481 | 42.72 |
| 28 | 16.5401 | 6.0585 | 1.49700 | 81.61 |
| 29 | 39.5339 | 5.1704 | | |
| 30ASPH | −153.1941 | 0.2000 | 1.51460 | 49.96 |
| 31 | −84.6842 | 1.0000 | 1.48749 | 70.44 |
| 32 | −120.4974 | D(32) | | |
| 33 | ∞ | 2.0000 | 1.51680 | 64.20 |
| 34 | ∞ | 1.0000 | | |

TABLE 14

| No. | K | A4 | A6 | A8 | A10 |
|---|---|---|---|---|---|
| 6 | 0.00000E+00 | 1.17659E−05 | −1.71813E−08 | 9.92318E−11 | −3.11252E−13 |
| 14 | 0.00000E+00 | −1.47671E−06 | −1.57141E−08 | 8.36707E−11 | −3.05218E−13 |
| 30 | 0.00000E+00 | −1.83853E−05 | −2.66019E−08 | 7.48453E−11 | −4.73022E−13 |

| No. | A12 | A14 | A16 | A18 | A20 |
|---|---|---|---|---|---|
| 6 | 5.02644E−16 | 0.00000E+00 | 0.00000E+00 | 0.00000E+00 | 0.00000E+00 |
| 14 | 0.00000E+00 | 0.00000E+00 | 0.00000E+00 | 0.00000E+00 | 0.00000E+00 |
| 30 | 0.00000E+00 | 0.00000E+00 | 0.00000E+00 | 0.00000E+00 | 0.00000E+00 |

TABLE 15

| F | 24.7626 | 42.2135 | 67.8916 |
|---|---|---|---|
| Fno | 2.9207 | 2.9127 | 2.9224 |
| W | 42.3268 | 26.9311 | 17.2675 |
| D(5) | 2.7009 | 14.7764 | 32.2706 |
| D(14) | 14.4813 | 5.1983 | 0.5017 |
| D(21) | 8.0970 | 2.5443 | 0.5000 |
| D(32) | 35.0000 | 48.7335 | 59.0745 |

Example 6

(1) Configuration of Optical System

Figure 21:
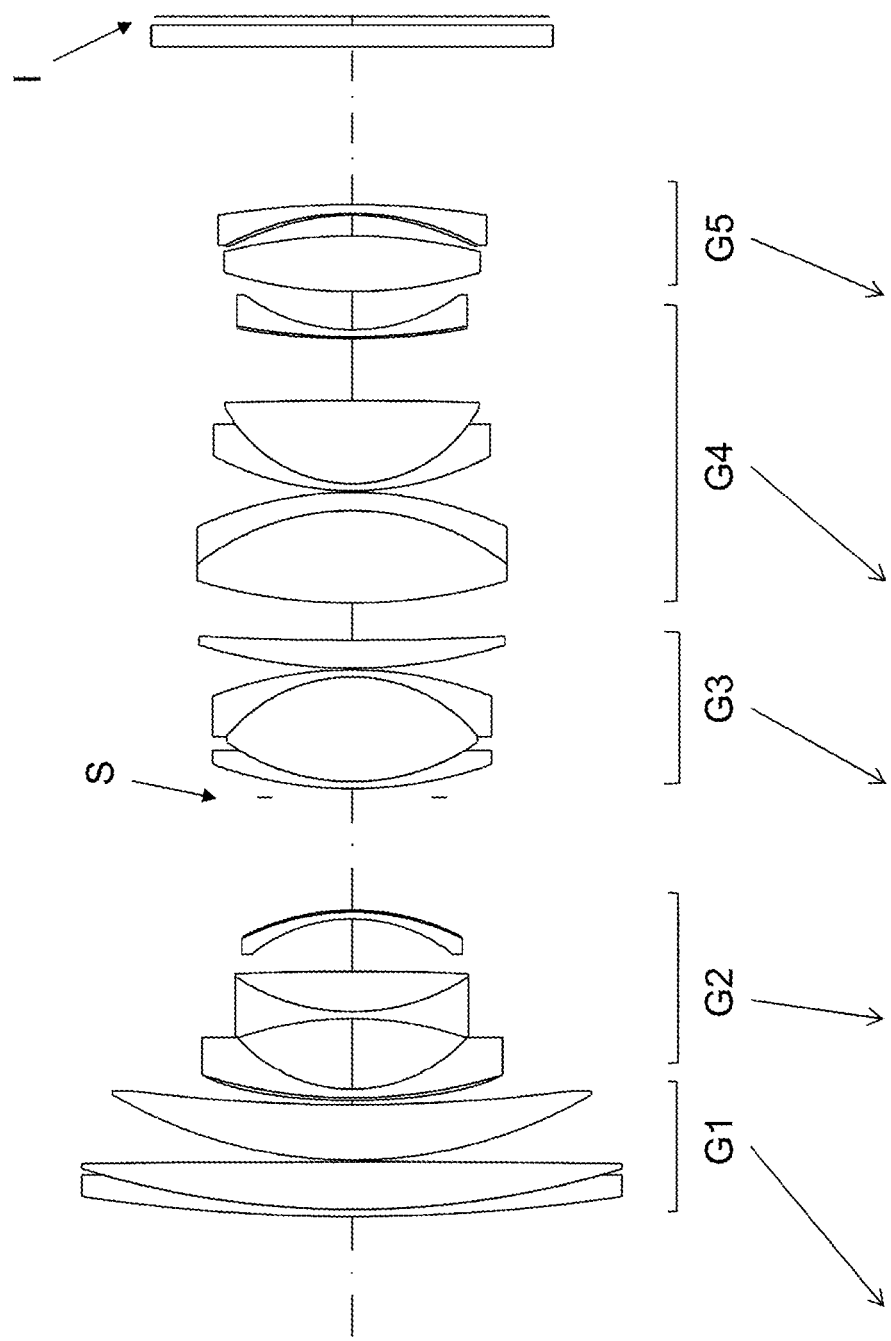
FIG. 21 is a cross-sectional view of a lens configuration example of a zoom lens of Example 6 of the present invention at a time of focusing to infinity at the wide angle end.

FIG. 21 is a cross-sectional view of a lens configuration example of a zoom lens of Example 6 of the present invention. The zoom lens consists of, in order from the object side, a first lens group G1 having positive refractive power, a second lens group G2 having negative refractive power, a third lens group G3 having positive refractive power, and a fourth lens group G4 having positive refractive power, and a fifth lens group G5 having negative refractive power, and achieves changing focal length by varying the intervals between the lens groups. During changing focal length from the wide angle end to the telephoto end, the first lens group G1 to the fifth lens group G5 follow different paths to move toward the object.

In the zoom lens of Example 6, the third lens group G3 to the fifth lens group G5 constitute a GR group of the present invention. The 17th surface and the 18th surface included in the third lens group G3, and the 23th surface and the 26th surface included in the fourth lens group G4 are cemented surfaces having negative refractive power in the present invention (see Table 16). In addition, in the third lens group G3, the lens closest to the image plane and having the 20th surface and the 21th surface is a convex lens GpH in the present invention (see Table 16). Further, the lens, included in the third lens group, that has the 17th surface and the 18th surface and constitutes a cemented lens; the lens, included in the fourth lens group G4, that is closest to the object in the group, constitutes a cemented lens, and has the 22th surface and the 23th surface; and the lens that is closest to the object in the fifth lens group and has the 31th surface and the 32th surface are convex lenses GpL in the present invention (see Table 16).

(2) Typical Numerical Values

Explanation will now be given of Typical numerical value 6 of the zoom lens to which specific numerical values are applied. Table 16 shows lens data related to the zoom lens.

Figure 22:
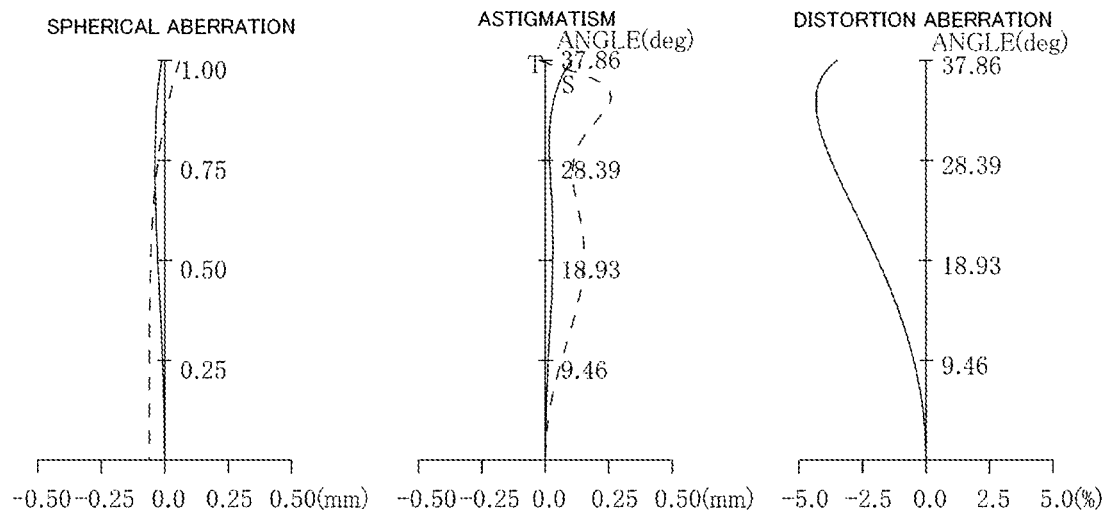
FIG. 22 shows a spherical aberration diagram, an astigmatism diagram, and a distortion aberration diagram of the zoom lens of Example 6 at a time of focusing to infinity at the wide angle end.
Figure 23:
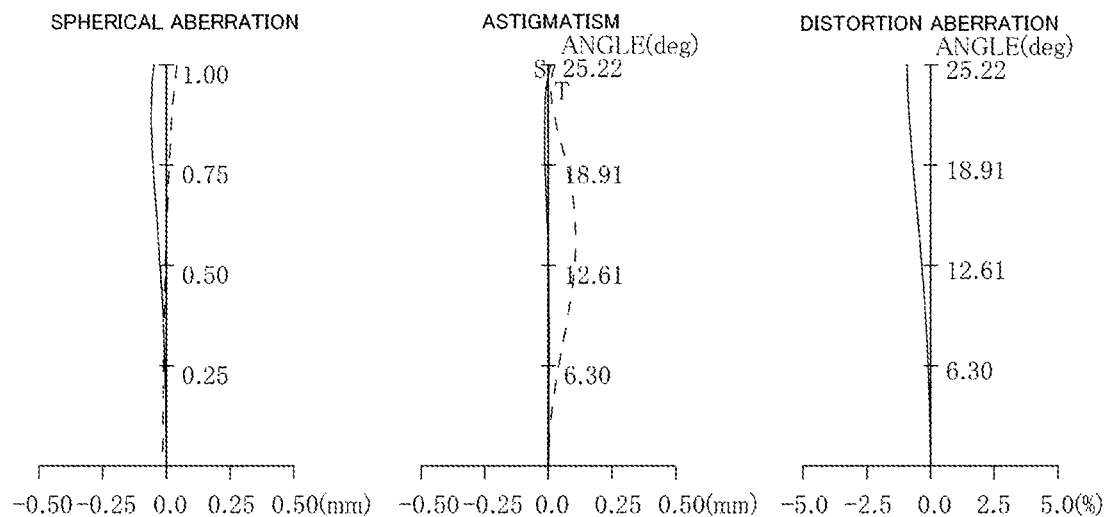
FIG. 23 shows a spherical aberration diagram, an astigmatism diagram, and a distortion aberration diagram of the zoom lens of Example 6 at a time of focusing to infinity at an intermediate focal length.
Figure 24:
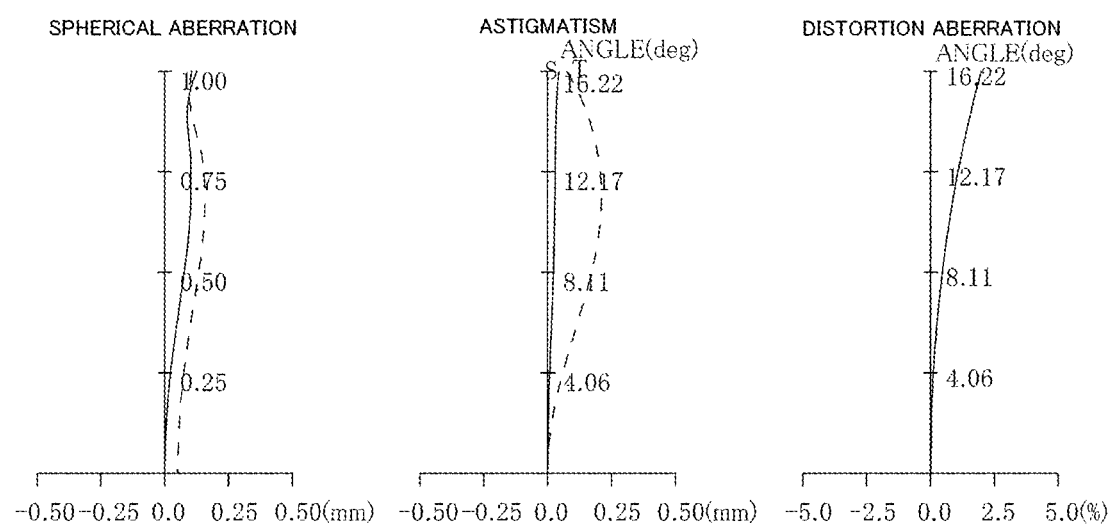
FIG. 24 shows a spherical aberration diagram, an astigmatism diagram, and a distortion aberration diagram of the zoom lens of Example 6 at a time of focusing to infinity at the telephoto end.

For an aspherical surface, the aspherical factor and the conic constant are shown in Table 17. Table 18 shows the F number (Fno) of the zoom lens having each focal length (F), the half image viewing angle (W), and the lens interval between movable group which moves during changing focal length and the adjacent lens group on its image side. FIGS. 22 to 24 are longitudinal aberrations diagrams of the zoom lens at a time of focusing to infinity. Table 28 shows the focal lengths (f1, f2, f3, f4, and f5) of the respective lens groups and the values in the conditional expressions (4) and (5). See Table 16 for values related to the conditional expressions (1) to (3), and see Table 18 for values related to the conditional expression (6).

TABLE 16

| No. | R | D | Nd | v d |
|---|---|---|---|---|
| 1 | 207.5498 | 0.8000 | 1.84666 | 23.78 |
| 2 | 103.2613 | 5.4524 | 1.49700 | 81.61 |
| 3 | −2007.5310 | 0.2000 | | |
| 4 | 53.0038 | 6.3307 | 1.59282 | 68.62 |
| 5 | 196.7987 | D(5) | | |
| 6ASPH | 70.4062 | 0.3000 | 1.51460 | 49.96 |
| 7 | 57.1319 | 1.0000 | 1.72916 | 54.67 |
| 8 | 17.3739 | 8.0567 | | |
| 9 | −39.1922 | 0.8000 | 1.61800 | 63.39 |
| 10 | 23.7568 | 4.6135 | 1.90366 | 31.31 |
| 11 | −350.6325 | 6.0068 | | |
| 12 | −18.1546 | 0.8000 | 1.72916 | 54.67 |
| 13 | −27.1337 | 0.2000 | 1.51460 | 49.96 |
| 14ASPH | −27.1337 | D(14) | | |
| 15STOP | ∞ | 1.0000 | | |
| 16 | 46.2428 | 0.8000 | 2.00100 | 29.13 |
| 17 | 24.6614 | 12.0000 | 1.49700 | 81.61 |
| 18 | −18.2109 | 0.8000 | 1.72916 | 54.67 |
| 19 | −43.1154 | 0.2000 | | |
| 20 | 58.0584 | 3.1904 | 1.92286 | 20.88 |
| 21 | 312.8281 | D(21) | | |
| 22 | 62.1409 | 10.5808 | 1.59282 | 68.62 |
| 23 | −28.1289 | 2.0754 | 2.00100 | 29.13 |
| 24 | −40.9740 | 0.2000 | | |
| 25 | 32.9464 | 0.8000 | 2.00100 | 29.13 |
| 26 | 16.2394 | 9.5000 | 1.56732 | 42.82 |
| 27 | −490.3985 | 7.1218 | | |
| 28ASPH | 77.7354 | 0.2000 | 1.51460 | 49.96 |
| 29 | 70.5805 | 0.8000 | 1.48749 | 70.44 |
| 30 | 20.6466 | D(30) | | |
| 31 | 49.0278 | 6.4479 | 1.48749 | 70.44 |
| 32 | −59.3545 | 2.3878 | | |
| 33ASPH | −25.2625 | 0.2000 | 1.51460 | 49.96 |
| 34 | −30.0068 | 1.0000 | 1.72916 | 54.67 |
| 35 | −96.0672 | D(35) | | |
| 36 | ∞ | 2.5000 | 1.51680 | 64.2 |
| 37 | ∞ | 1.0000 | | |

TABLE 17

| No. | K | A4 | A6 | A8 | A10 |
|---|---|---|---|---|---|
| 6 | 0.00000E+00 | 5.87977E−06 | −1.03717E−09 | 9.16126E−11 | −4.16372E−13 |
| 14 | 0.00000E+00 | −6.54452E−07 | −2.33693E−10 | −4.39359E−11 | 1.05431E−13 |
| 28 | 0.00000E+00 | −2.67450E−06 | 2.95136E−08 | −1.25030E−10 | 6.99148E−13 |
| 33 | 0.00000E+00 | 1.26908E−05 | 1.44019E−08 | 2.61421E−11 | 0.00000E+00 |

| No. | A12 | A14 | A16 | A18 | A20 |
|---|---|---|---|---|---|
| 6 | 9.66541E−16 | 0.00000E+00 | 0.00000E+00 | 0.00000E+00 | 0.00000E+00 |
| 14 | 0.00000E+00 | 0.00000E+00 | 0.00000E+00 | 0.00000E+00 | 0.00000E+00 |
| 28 | 0.00000E+00 | 0.00000E+00 | 0.00000E+00 | 0.00000E+00 | 0.00000E+00 |
| 33 | 0.00000E+00 | 0.00000E+00 | 0.00000E+00 | 0.00000E+00 | 0.00000E+00 |

TABLE 18

| F | 28.8550 | 46.3781 | 72.7963 |
|---|---|---|---|
| Fno | 2.9146 | 2.9039 | 2.9109 |
| W | 37.8572 | 25.2169 | 16.2227 |
| D(5) | 0.5000 | 8.3771 | 28.7168 |
| D(14) | 12.9226 | 4.5468 | 0.5000 |
| D(21) | 4.2776 | 0.6209 | 0.5000 |
| D(30) | 4.3714 | 10.1862 | 11.4227 |
| D(35) | 18.0798 | 25.2443 | 28.6339 |

Example 7

(1) Configuration of Optical System

Figure 25:
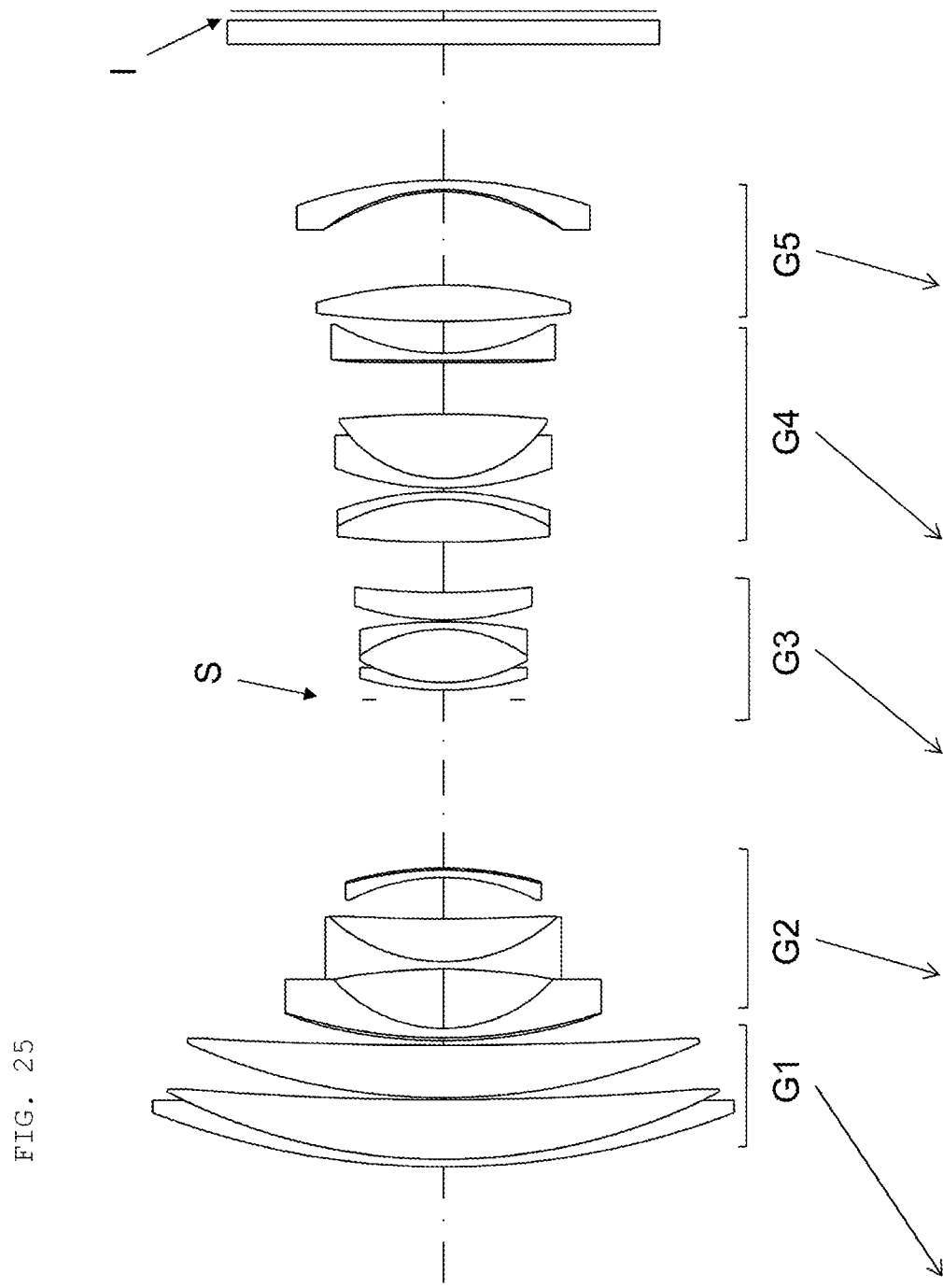
FIG. 25 is a cross-sectional view of a lens configuration example of a zoom lens of Example 7 of the present invention at a time of focusing to infinity at the wide angle end.

FIG. 25 is a cross-sectional view of a lens configuration example of a zoom lens of Example 2 of the present invention. The zoom lens consists of, in order from the object side, a first lens group G1 having positive refractive power, a second lens group G2 having negative refractive power, a third lens group G3 having positive refractive power, and a fourth lens group G4 having positive refractive power, and a fifth lens group G5 having negative refractive power, and achieves changing focal length by varying the intervals between the lens groups. During changing focal length from the wide angle end to the telephoto end, the first lens group G1 to the fifth lens group G5 follow different paths to move toward the object.

In the zoom lens of Example 7, the third lens group G3 to the fifth lens group G5 constitute a GR group of the present invention. The 17th surface and the 18th surface included in the third lens group G3, and the 23th surface and the 26th surface included in the fourth lens group G4 are cemented surfaces having negative refractive power in the present invention (see Table 19). In addition, in the third lens group G3, the lens closest to the image plane and having the 20th surface and the 21th surface is a convex lens GpH in the present invention (see Table 19). Further, the lens, included in the third lens group, that has the 17th surface and the 18th surface and constitutes a cemented lens; and the lens, included in the fourth lens group G4, that is closest to the object in the group, constitutes a cemented lens, and has the 22th surface and the 23th surface are convex lenses GpL in the present invention (see Table 19).

(2) Typical Numerical Values

Figure 26:
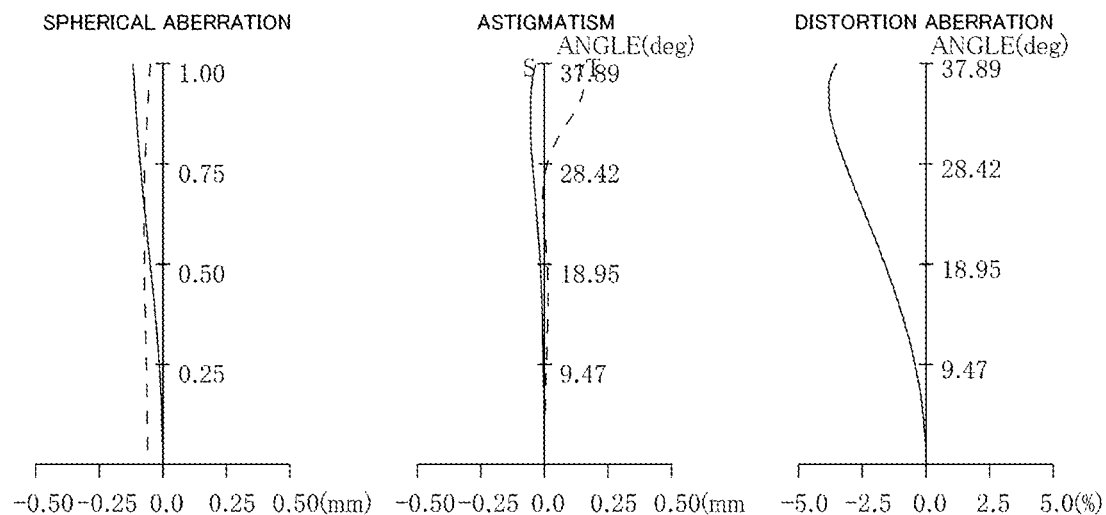
FIG. 26 shows a spherical aberration diagram, an astigmatism diagram, and a distortion aberration diagram of the zoom lens of Example 7 at a time of focusing to infinity at the wide angle end.
Figure 27:
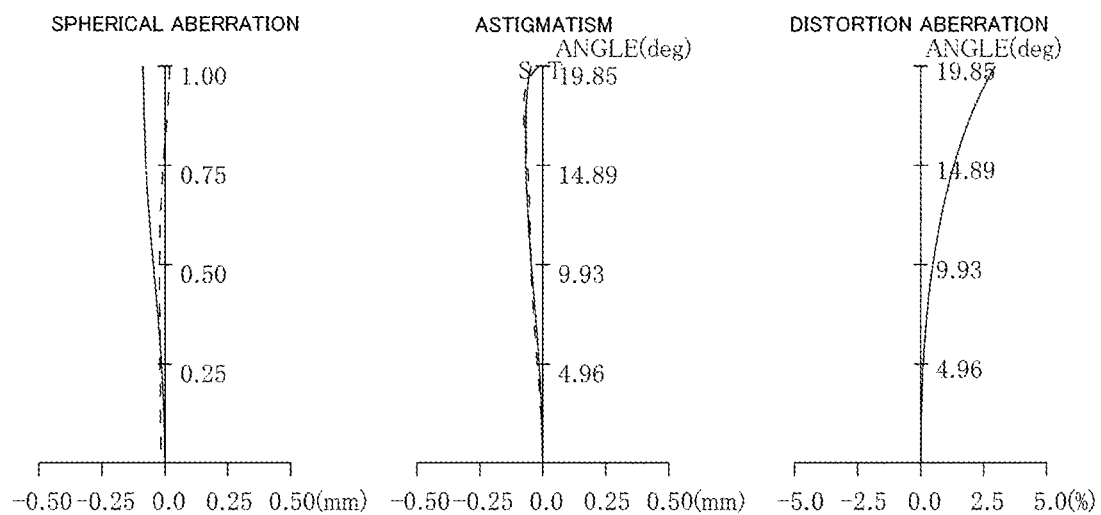
FIG. 27 shows a spherical aberration diagram, an astigmatism diagram, and a distortion aberration diagram of the zoom lens of Example 7 at a time of focusing to infinity at an intermediate focal length.
Figure 28:
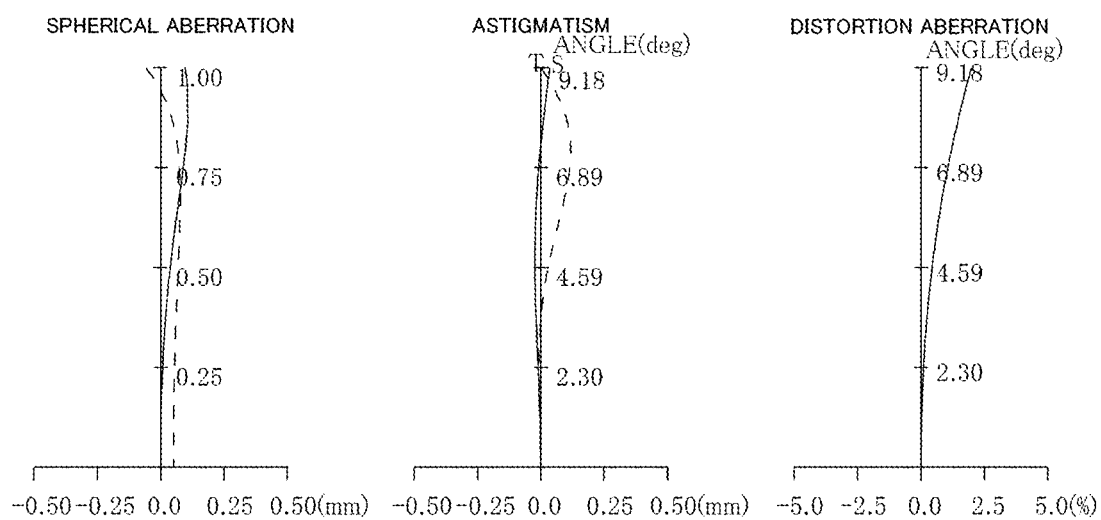
FIG. 28 shows a spherical aberration diagram, an astigmatism diagram, and a distortion aberration diagram of the zoom lens of Example 7 at a time of focusing to infinity at the telephoto end.

Explanation will now be given of Typical numerical value 7 of the zoom lens to which specific numerical values are applied. Table 19 shows lens data related to the zoom lens. For an aspherical surface, the aspherical factor and the conic constant are shown in Table 20. Table 21 shows the F number (Fno) of the zoom lens having each focal length (F), the half image viewing angle (W), and the lens interval between movable group which moves during changing focal length and the adjacent lens group on its image side. FIGS. 26 to 28 are longitudinal aberrations diagrams of the zoom lens at a time of focusing to infinity. Table 28 shows the focal lengths (f1, f2, f3, f4, and f5) of the respective lens groups and the values in the conditional expressions (4) and (5). See Table 21 for values related to the conditional expressions (1) to (3), and see Table 19 for values related to the conditional expression (6).

TABLE 19

| No. | R | D | Nd | v d |
|---|---|---|---|---|
| 1 | 84.3024 | 0.8000 | 1.84666 | 23.78 |
| 2 | 62.5926 | 6.3443 | 1.49700 | 81.61 |
| 3 | 330.3560 | 0.2000 | | |
| 4 | 65.7334 | 5.5734 | 1.49700 | 81.61 |
| 5 | 447.8758 | D(5) | | |
| 6ASPH | 54.3719 | 0.3000 | 1.51460 | 49.96 |
| 7 | 53.4223 | 1.0000 | 1.72916 | 54.67 |
| 8 | 15.4560 | 6.2870 | | |
| 9 | −63.4884 | 0.8000 | 1.61997 | 63.88 |
| 10 | 17.5172 | 4.5555 | 1.90366 | 31.31 |
| 11 | 187.6994 | 4.3860 | | |
| 12 | −21.4704 | 0.8000 | 1.77250 | 49.62 |
| 13 | −37.2438 | 0.2000 | 1.51460 | 49.96 |
| 14ASPH | −37.2438 | D(14) | | |
| 15STOP | ∞ | 1.0000 | | |
| 16 | 31.3646 | 0.8000 | 2.00100 | 29.13 |
| 17 | 17.7346 | 5.6769 | 1.49700 | 81.61 |
| 18 | −15.2319 | 0.8000 | 1.72916 | 54.67 |
| 19 | −46.0205 | 0.2000 | | |
| 20 | 30.1538 | 2.9113 | 1.84666 | 23.78 |
| 21 | 77.3404 | D(21) | | |
| 22 | 105.4421 | 4.5488 | 1.59282 | 68.62 |
| 23 | −23.1616 | 0.8000 | 2.00100 | 29.13 |
| 24 | −32.5942 | 0.4025 | | |
| 25 | 31.9391 | 1.0046 | 1.95375 | 32.32 |
| 26 | 13.0143 | 6.8272 | 1.59551 | 39.24 |
| 27 | −125.7029 | 5.4880 | | |
| 28ASPH | 912.0688 | 0.2000 | 1.51460 | 49.96 |
| 29 | 593.4635 | 0.8000 | 1.48749 | 70.44 |
| 30 | 22.5973 | D(30) | | |
| 31 | 103.3691 | 3.8554 | 1.51742 | 52.15 |
| 32 | −48.9646 | 9.9860 | | |
| 33ASPH | −19.1601 | 0.2000 | 1.51460 | 49.96 |
| 34 | −20.9168 | 1.0000 | 1.72916 | 54.67 |
| 35 | −45.4656 | D(35) | | |
| 36 | ∞ | 2.5000 | 1.51680 | 64.20 |
| 37 | ∞ | 1.0000 | | |

TABLE 20

| No. | K | A4 | A6 | A8 | A10 |
|---|---|---|---|---|---|
| 6 | 0.00000E+00 | 1.71157E−06 | 1.18861E−09 | 3.38388E−11 | −1.90861E−13 |
| 14 | 0.00000E+00 | −1.11777E−06 | 2.27991E−09 | −1.08008E−10 | 7.44692E−13 |
| 28 | 0.00000E+00 | −4.53672E−08 | 5.06353E−08 | −4.93036E−11 | 2.48692E−12 |
| 33 | 0.00000E+00 | 2.07822E−05 | 2.11072E−08 | 1.16418E−10 | 0.00000E+00 |

| No. | A12 | A14 | A16 | A18 | A20 |
|---|---|---|---|---|---|
| 6 | 5.36068E−16 | 0.00000E+00 | 0.00000E+00 | 0.00000E+00 | 0.00000E+00 |
| 14 | 0.00000E+00 | 0.00000E+00 | 0.00000E+00 | 0.00000E+00 | 0.00000E+00 |
| 28 | 0.00000E+00 | 0.00000E+00 | 0.00000E+00 | 0.00000E+00 | 0.00000E+00 |
| 33 | 0.00000E+00 | 0.00000E+00 | 0.00000E+00 | 0.00000E+00 | 0.00000E+00 |

TABLE 21

| F | 28.8545 | 58.2381 | 131.0533 |
|---|---|---|---|
| Fno | 3.8576 | 4.9761 | 6.4925 |
| W | 37.8925 | 19.8514 | 9.1830 |
| D(5) | 0.5000 | 19.3649 | 39.7906 |
| D(14) | 17.9058 | 8.5564 | 0.5000 |
| D(21) | 5.3449 | 2.5759 | 2.2903 |
| D(30) | 3.3909 | 10.9158 | 17.2018 |
| D(35) | 14.4999 | 22.0130 | 33.9574 |

Example 8

(1) Configuration of Optical System

Figure 29:
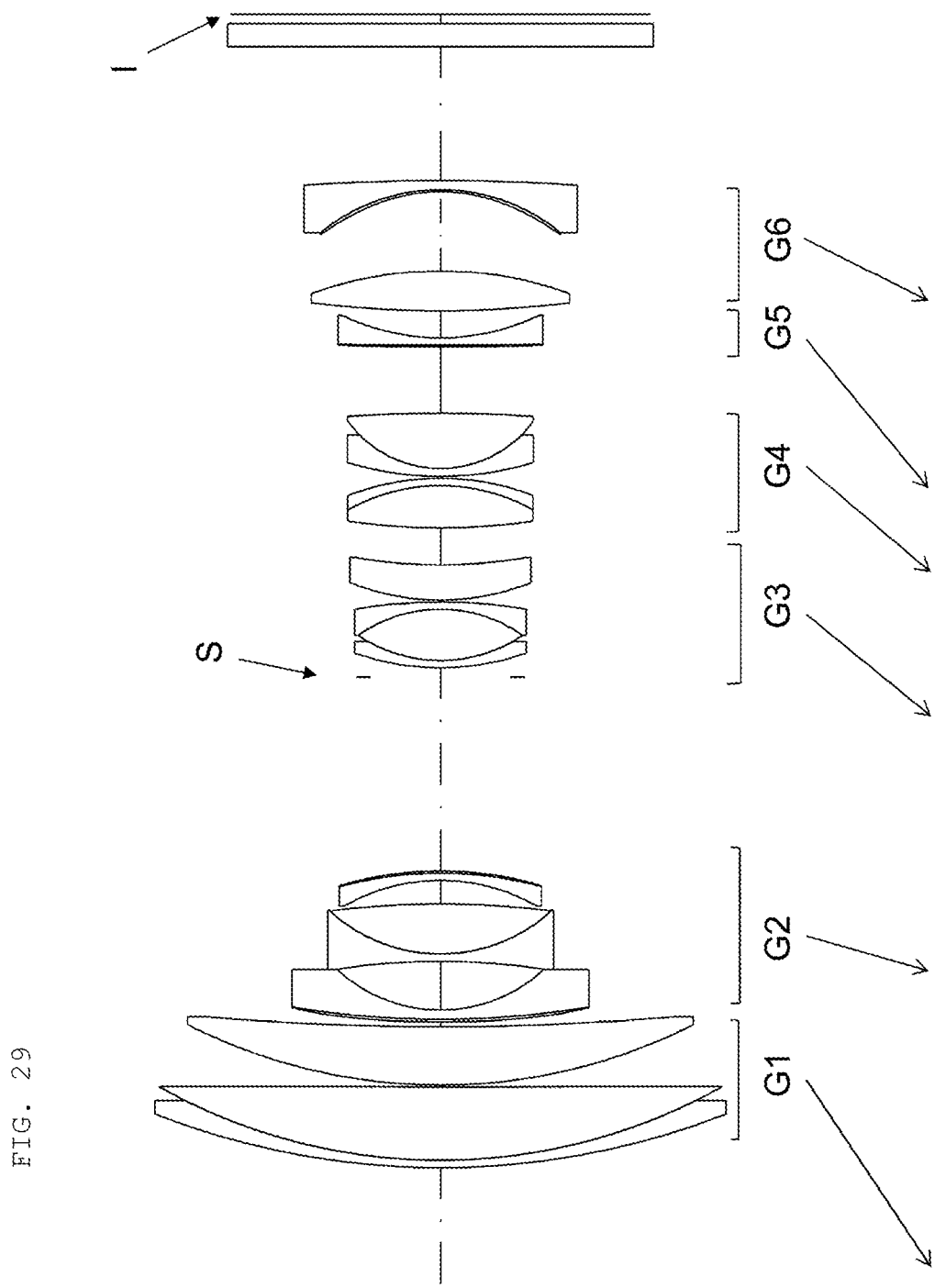
FIG. 29 is a cross-sectional view of a lens configuration example of a zoom lens of Example 8 of the present invention at a time of focusing to infinity at the wide angle end.

FIG. 29 is a cross-sectional view of a lens configuration example of a zoom lens of Example 8 of the present invention. The zoom lens consists of, in order from the object side, a first lens group G1 having positive refractive power, a second lens group G2 having negative refractive power, a third lens group G3 having positive refractive power, and a fourth lens group G4 having positive refractive power, a fifth lens group G5 having negative refractive power, and a sixth lens group G6 having negative refractive power, and achieves changing focal length by varying the intervals between the lens groups. During changing focal length from the wide angle end to the telephoto end, the first lens group G1 to the sixth lens group G6 follow different paths to move toward the object.

In the zoom lens of Example 8, the third lens group G3 to the sixth lens group G6 constitute a GR group of the present invention. The 17th surface and the 18th surface included in the third lens group G3, and the 23th surface and the 26th surface included in the fourth lens group G4 are cemented surfaces having negative refractive power in the present invention (see Table 22). In addition, in the third lens group G3, the lens closest to the image plane and having the 20th surface and the 21th surface is a convex lens GpH in the present invention (see Table 22). Further, the lens, included in the third lens group, that has the 17th surface and the 18th surface and constitutes a cemented lens; and the lens, included in the fourth lens group G4, that is closest to the object in the group, constitutes a cemented lens, and has the 22th surface and the 23th surface are convex lenses GpL in the present invention (see Table 22).

(2) Typical Numerical Values

Figure 30:
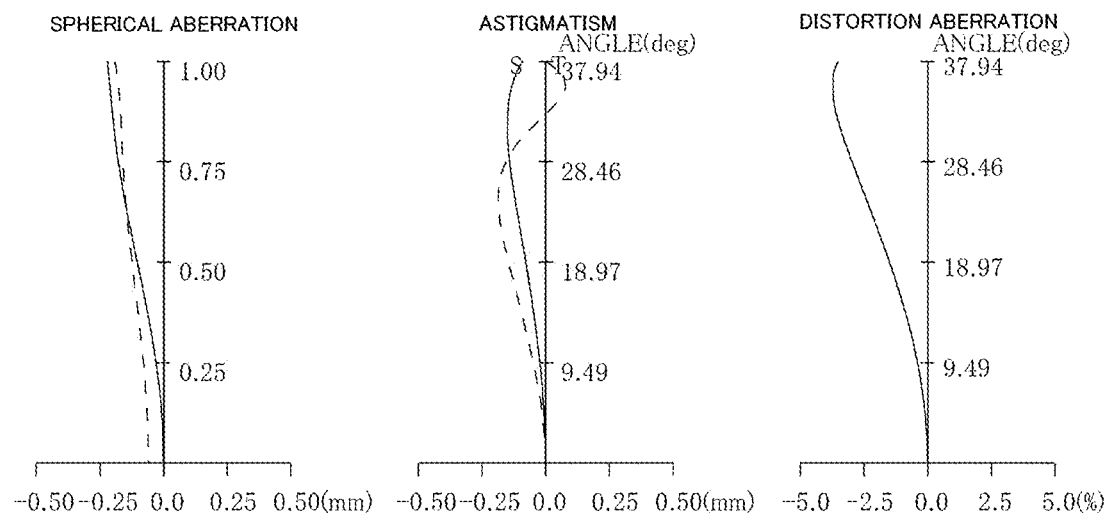
FIG. 30 shows a spherical aberration diagram, an astigmatism diagram, and a distortion aberration diagram of the zoom lens of Example 8 at a time of focusing to infinity at the wide angle end.
Figure 31:
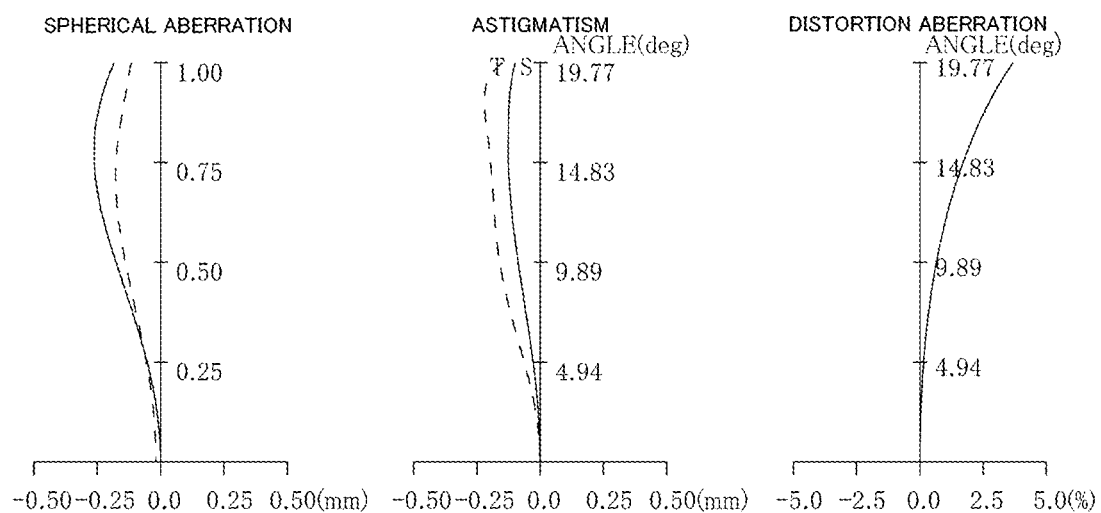
FIG. 31 shows a spherical aberration diagram, an astigmatism diagram, and a distortion aberration diagram of the zoom lens of Example 8 at a time of focusing to infinity at an intermediate focal length.
Figure 32:
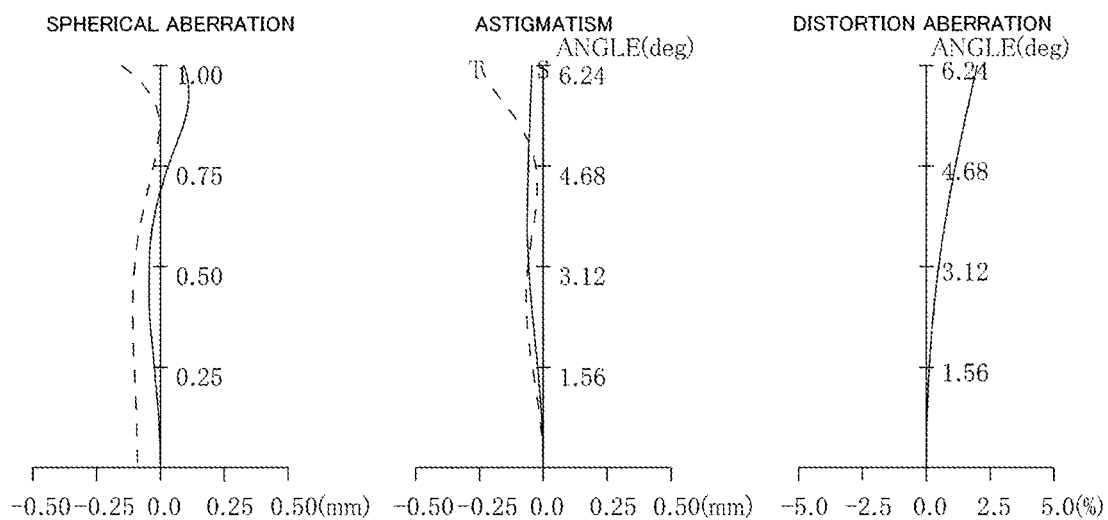
FIG. 32 shows a spherical aberration diagram, an astigmatism diagram, and a distortion aberration diagram of the zoom lens of Example 8 at a time of focusing to infinity at the telephoto end.

Explanation will now be given of Typical numerical value 8 of the zoom lens to which specific numerical values are applied. Table 22 shows lens data related to the zoom lens. For an aspherical surface, the aspherical factor and the conic constant are shown in Table 23. Table 24 shows the F number (Fno) of the zoom lens having each focal length (F), the half image viewing angle (W), and the lens interval between movable group which moves during changing focal length and the adjacent lens group on its image side. FIGS. 30 to 32 are longitudinal aberrations diagrams of the zoom lens at a time of focusing to infinity. Table 28 shows the focal lengths (f1, f2, f3, f4, f5, and f6) of the respective lens groups and the values in the conditional expressions (4) and (5). See Table 22 for values related to the conditional expressions (1) to (3), and see Table 24 for values related to the conditional expression (6).

TABLE 22

| No. | R | D | Nd | v d |
|---|---|---|---|---|
| 1 | 83.6207 | 0.8000 | 2.00100 | 29.13 |
| 2 | 61.2382 | 7.9291 | 1.49700 | 81.61 |
| 3 | 5602.9537 | 0.2000 | | |
| 4 | 59.4330 | 6.3184 | 1.49700 | 81.61 |
| 5 | 294.4748 | D(5) | | |
| 6ASPH | 99.0921 | 0.3000 | 1.51460 | 49.96 |
| 7 | 96.4182 | 1.0000 | 1.72916 | 54.67 |
| 8 | 16.1683 | 5.2702 | | |
| 9 | −72.2590 | 0.8000 | 1.72916 | 54.67 |
| 10 | 17.4270 | 5.4028 | 1.85026 | 32.27 |
| 11 | −93.3368 | 2.5519 | | |
| 12 | −20.4968 | 0.8000 | 1.72916 | 54.67 |
| 13 | −40.5950 | 0.2000 | 1.51460 | 49.96 |
| 14ASPH | −40.5950 | D(14) | | |
| 15STOP | ∞ | 1.0000 | | |
| 16 | 27.3465 | 0.8000 | 1.95375 | 32.32 |
| 17 | 15.7773 | 5.5233 | 1.49700 | 81.61 |
| 18 | −15.1844 | 0.8000 | 1.72916 | 54.67 |
| 19 | −52.6882 | 0.2000 | | |
| 20 | 25.8430 | 3.8046 | 1.84666 | 23.78 |
| 21 | 52.5542 | D(21) | | |
| 22 | 67.5638 | 4.5662 | 1.49700 | 81.61 |
| 23 | −20.0463 | 0.8000 | 1.88100 | 40.14 |
| 24 | −27.3367 | 0.2015 | | |
| 25 | 33.6991 | 0.8663 | 2.00100 | 29.13 |
| 26 | 12.2474 | 5.9466 | 1.62004 | 36.30 |
| 27 | −154.3691 | D(27) | | |
| 28ASPH | 438.5022 | 0.2000 | 1.51460 | 49.96 |
| 29 | 518.3121 | 0.8000 | 1.49700 | 81.61 |
| 30 | 24.2254 | D(30) | | |
| 31 | 112.0159 | 4.3257 | 1.54072 | 47.20 |
| 32 | −39.9643 | 8.6233 | | |
| 33ASPH | −17.5551 | 0.2000 | 1.51460 | 49.96 |
| 34 | −20.1604 | 1.0000 | 1.48749 | 70.44 |
| 35 | −211.8337 | D(35) | | |
| 36 | ∞ | 2.5000 | 1.51680 | 64.20 |
| 37 | ∞ | 1.0000 | | |

TABLE 23

| No. | K | A4 | A6 | A8 | A10 |
|---|---|---|---|---|---|
| 6 | 0.00000E+00 | 2.76680E-06 | 1.48799E-09 | 3.31242E-11 | -2.28534E-13 |
| 14 | 0.00000E+00 | -9.81590E-06 | -6.06290E-09 | 1.43512E-11 | 3.27198E-13 |
| 28 | 0.00000E+00 | -1.35413E-07 | 1.84132E-08 | 2.69727E-10 | 1.94253E-12 |
| 33 | 0.00000E+00 | 2.42519E-05 | 2.45297E-08 | 1.99861E-10 | 0.00000E+00 |

| No. | A12 | A14 | A16 | A18 | A20 |
|---|---|---|---|---|---|
| 6 | 7.67355E-16 | 0.00000E+00 | 0.00000E+00 | 0.00000E+00 | 0.00000E+00 |
| 14 | 0.00000E+00 | 0.00000E+00 | 0.00000E+00 | 0.00000E+00 | 0.00000E+00 |
| 28 | 0.00000E+00 | 0.00000E+00 | 0.00000E+00 | 0.00000E+00 | 0.00000E+00 |
| 33 | 0.00000E+00 | 0.00000E+00 | 0.00000E+00 | 0.00000E+00 | 0.00000E+00 |

TABLE 24

| F | 28.8666 | 58.2502 | 193.9354 |
|---|---|---|---|
| Fno | 3.8225 | 4.9891 | 6.5351 |
| W | 37.9402 | 19.7732 | 6.2381 |
| D(5) | 0.5000 | 16.1634 | 47.8025 |
| D(14) | 21.0106 | 10.7698 | 0.5000 |
| D(21) | 4.0002 | 1.6038 | 0.5000 |
| D(27) | 7.1838 | 7.8794 | 2.2418 |
| D(30) | 2.9264 | 10.0378 | 24.9891 |
| D(35) | 14.4998 | 21.6826 | 34.2369 |

Example 9

(1) Configuration of Optical System

Figure 33:
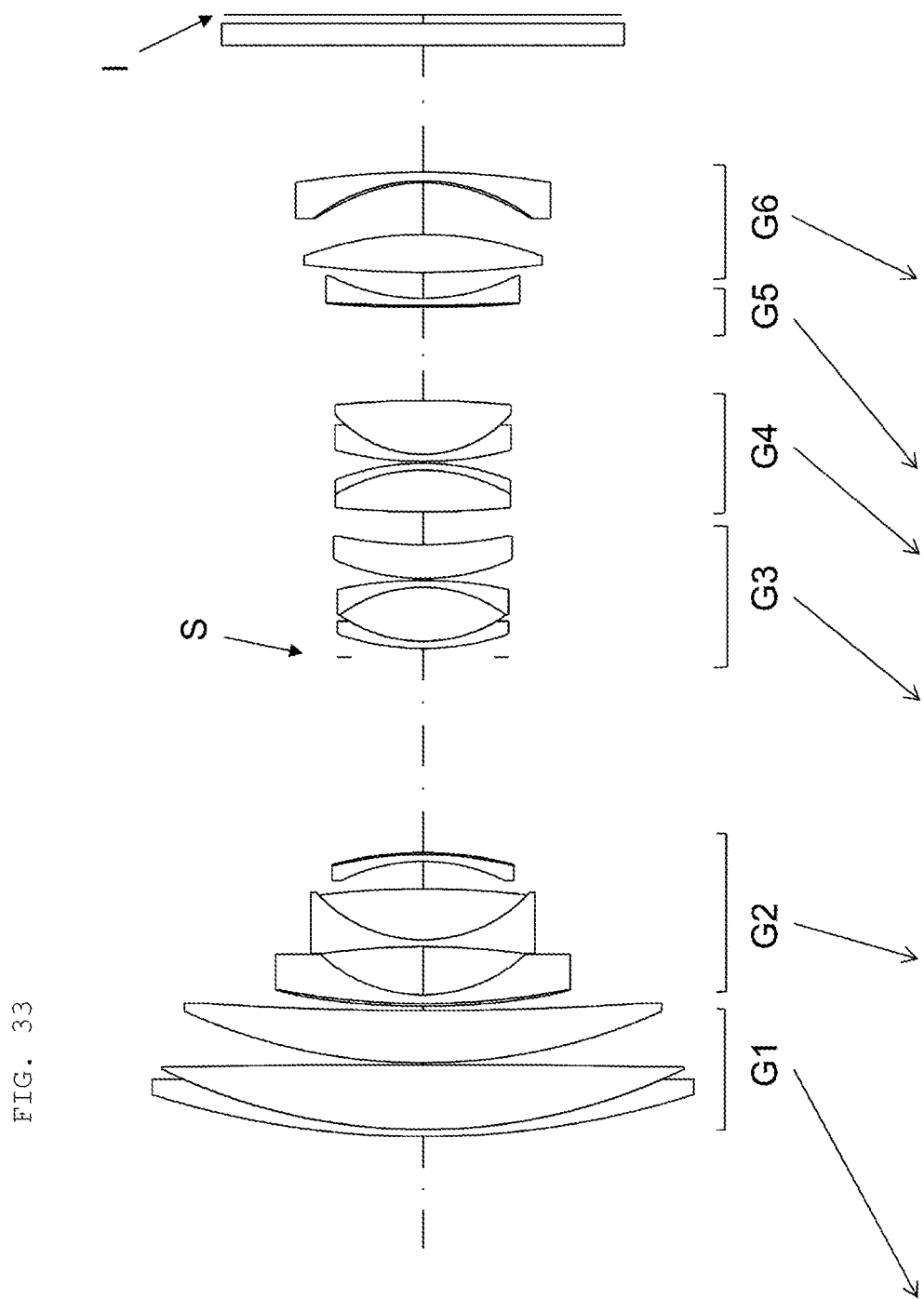
FIG. 33 is a cross-sectional view of a lens configuration example of a zoom lens of Example 9 of the present invention at a time of focusing to infinity at the wide angle end.
Figure 34:
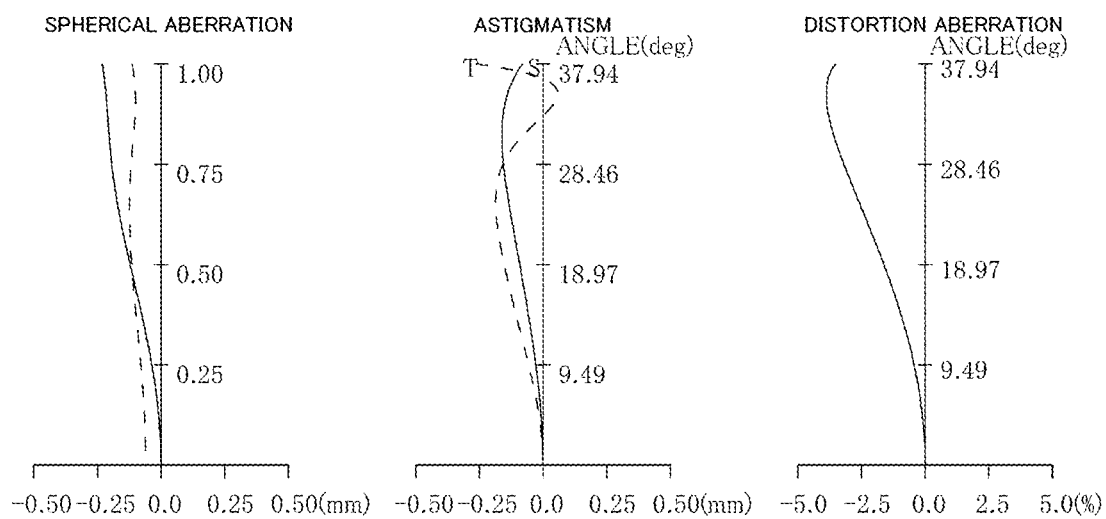
FIG. 34 shows a spherical aberration diagram, an astigmatism diagram, and a distortion aberration diagram of the zoom lens of Example 9 at a time of focusing to infinity at the wide angle end.
Figure 35:
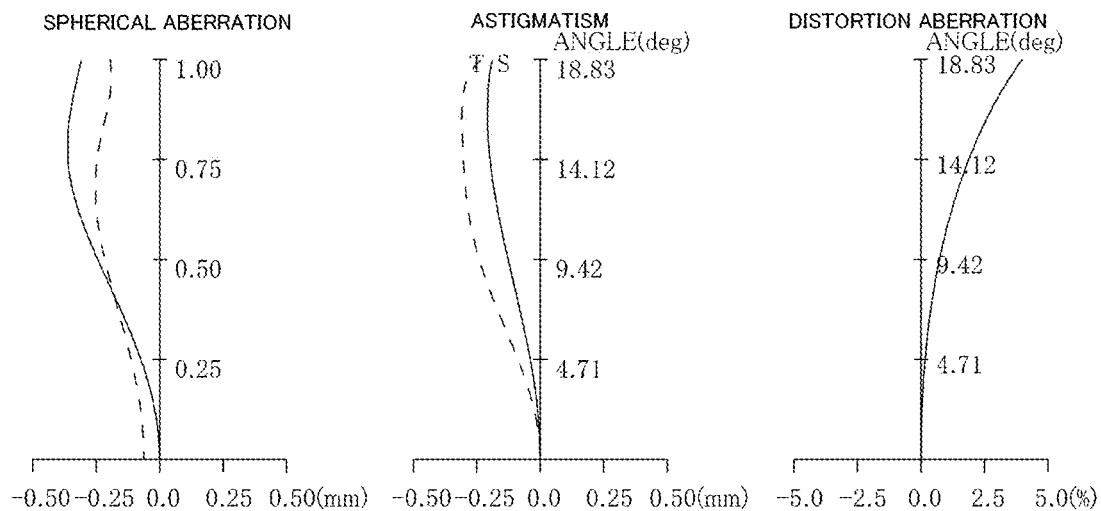
FIG. 35 shows a spherical aberration diagram, an astigmatism diagram, and a distortion aberration diagram of the zoom lens of Example 9 at a time of focusing to infinity at an intermediate focal length.
Figure 36:
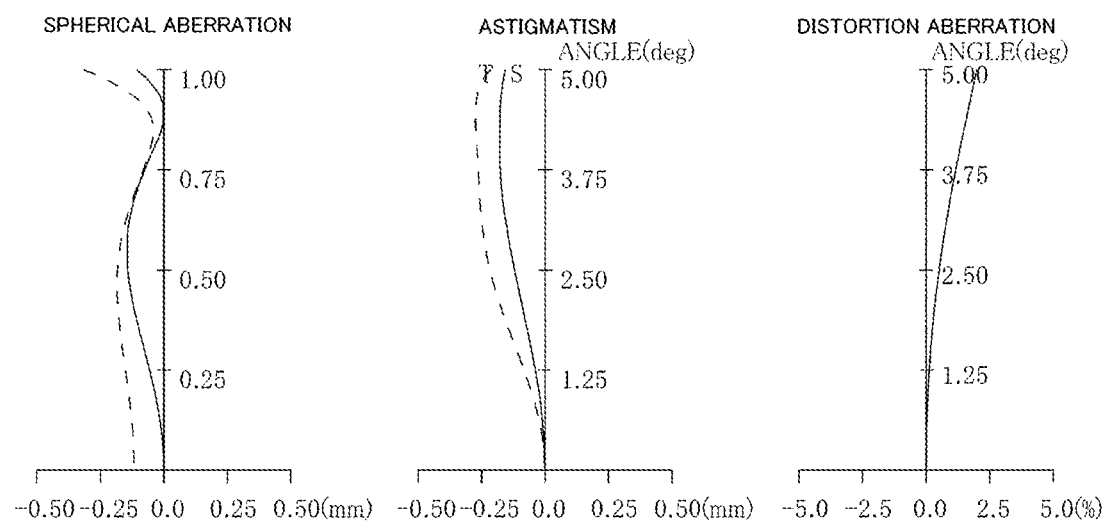
FIG. 36 shows a spherical aberration diagram, an astigmatism diagram, and a distortion aberration diagram of the zoom lens of Example 9 at a time of focusing to infinity at the telephoto end.

FIG. 33 is a cross-sectional view of a lens configuration example of a zoom lens of Example 9 of the present invention. The zoom lens consists of, in order from the object side, a first lens group G1 having positive refractive power, a second lens group G2 having negative refractive power, a third lens group G3 having positive refractive power, and a fourth lens group G4 having positive refractive power, a fifth lens group G5 having negative refractive power, and a sixth lens group G6 having negative refractive power, and achieves changing focal length by varying the intervals between the lens groups. During changing focal length from the wide angle end to the telephoto end, the first lens group G1 to the sixth lens group G6 follow different paths to move toward the object.

In the zoom lens of Example 9, the third lens group G3 to the sixth lens group G6 constitute a GR group of the present invention. The 17th surface and the 18th surface included in the third lens group G3, and the 23th surface and the 26th surface included in the fourth lens group G4 are cemented surfaces having negative refractive power in the present invention (see Table 25). In addition, in the third lens group G3, the lens closest to the image plane and having the 20th surface and the 21th surface is a convex lens GpH in the present invention (see Table 25). Further, the lens, included in the third lens group, that has the 17th surface and the 18th surface and constitutes a cemented lens; and the lens, included in the fourth lens group G4, that is closest to the object in the group, constitutes a cemented lens, and has the 22th surface and the 23th surface are convex lenses GpL in the present invention (see Table 25).

(2) Typical Numerical Values

Explanation will now be given of Typical numerical value 9 of the zoom lens to which specific numerical values are applied. Table 25 shows lens data related to the zoom lens. For an aspherical surface, the aspherical factor and the conic constant are shown in Table 26. Table 27 shows the F number (Fno) of the zoom lens having each focal length (F), the half image viewing angle (W), and the lens interval between movable group which moves during changing focal length and the adjacent lens group on its image side. FIGS. 33 to 36 are longitudinal aberrations diagrams of the zoom lens at a time of focusing to infinity. Table 28 shows the focal lengths (f1, f2, f3, f4, f5, and f6) of the respective lens groups and the values in the conditional expressions (4) and (5). See Table 25 for values related to the conditional expressions (1) to (3), and see Table 27 for values related to the conditional expression (6).

TABLE 25

| No. | R | D | Nd | v d |
|---|---|---|---|---|
| 1 | 100.1564 | 0.8000 | 1.95375 | 32.32 |
| 2 | 66.6606 | 7.4198 | 1.49700 | 81.61 |
| 3 | -1544.5030 | 0.2000 | | |
| 4 | 64.8149 | 5.9889 | 1.49700 | 81.61 |
| 5 | 376.7122 | D(5) | | |
| 6ASPH | 86.8479 | 0.3000 | 1.51460 | 49.96 |
| 7 | 86.3426 | 1.0000 | 1.77250 | 49.62 |
| 8 | 16.8673 | 5.4906 | | |
| 9 | -85.0169 | 0.8000 | 1.72916 | 54.67 |
| 10 | 16.2048 | 5.8111 | 1.85026 | 32.27 |
| 11 | -101.9090 | 3.1402 | | |
| 12 | -20.6936 | 0.8000 | 1.72916 | 54.67 |
| 13 | -41.1473 | 0.2000 | 1.51460 | 49.96 |
| 14ASPH | -41.1473 | D(14) | | |
| 15STOP | ∞ | 1.0000 | | |
| 16 | 29.2268 | 0.8138 | 1.95375 | 32.32 |
| 17 | 16.1615 | 6.1792 | 1.49700 | 81.61 |
| 18 | -15.4490 | 0.8000 | 1.72916 | 54.67 |
| 19 | -44.6112 | 0.2000 | | |
| 20 | 24.3718 | 3.8548 | 1.80809 | 22.76 |
| 21 | 46.2223 | D(21) | | |
| 22 | 107.6388 | 4.7503 | 1.51680 | 64.20 |
| 23 | -19.0311 | 0.8000 | 1.90366 | 31.31 |
| 24 | -26.3749 | 0.2000 | | |
| 25 | 39.2976 | 0.8000 | 2.00100 | 29.13 |
| 26 | 12.9805 | 6.1326 | 1.62004 | 36.30 |
| 27 | -102.7038 | D(27) | | |
| 28ASPH | 177.1019 | 0.2000 | 1.51460 | 49.96 |
| 29 | 182.8385 | 0.8000 | 1.49700 | 81.61 |
| 30 | 22.9019 | D(30) | | |
| 31 | 100.6066 | 4.3907 | 1.59551 | 39.24 |
| 32 | -38.0008 | 5.9208 | | |
| 33ASPH | -17.5398 | 0.2000 | 1.51460 | 49.96 |
| 34 | -19.9917 | 1.0000 | 1.72916 | 54.67 |
| 35 | -88.4082 | D(35) | | |
| 36 | ∞ | 2.5000 | 1.51680 | 64.20 |
| 37 | ∞ | 1.0000 | | |

TABLE 26

| No. | K | A4 | A6 | A8 | A10 |
|---|---|---|---|---|---|
| 6  | 0.00000E+00 | 1.32800E−06  | −1.98034E−10 | 5.12477E−11 | −2.68318E−13 |
| 14 | 0.00000E+00 | −8.10190E−06 | −3.29038E−09 | 5.37369E−11 | −1.91966E−13 |
| 28 | 0.00000E+00 | 3.04575E−06  | −6.21540E−09 | 2.01877E−10 | 9.38087E−13  |
| 33 | 0.00000E+00 | 3.07981E−05  | 3.50357E−08  | 1.94261E−10 | 0.00000E+00  |

| No. | A12 | A14 | A16 | A18 | A20 |
|---|---|---|---|---|---|
| 6  | 6.60253E−16 | 0.00000E+00 | 0.00000E+00 | 0.00000E+00 | 0.00000E+00 |
| 14 | 0.00000E+00 | 0.00000E+00 | 0.00000E+00 | 0.00000E+00 | 0.00000E+00 |
| 28 | 0.00000E+00 | 0.00000E+00 | 0.00000E+00 | 0.00000E+00 | 0.00000E+00 |
| 33 | 0.00000E+00 | 0.00000E+00 | 0.00000E+00 | 0.00000E+00 | 0.00000E+00 |

TABLE 27

| | | | |
|---|---|---|---|
| F     | 28.8613 | 61.3234 | 242.4803 |
| Fno   | 3.6947  | 5.1023  | 6.5024   |
| W     | 37.9427 | 18.8308 | 5.0041   |
| D(5)  | 0.5000  | 17.1786 | 60.3968  |
| D(14) | 22.3479 | 9.9935  | 0.5000   |
| D(21) | 3.7761  | 1.4885  | 0.5000   |
| D(27) | 10.6946 | 12.8175 | 2.3874   |
| D(30) | 2.9882  | 9.7468  | 26.5139  |
| D(35) | 14.4999 | 21.7607 | 36.2096  |

TABLE 28

| | Example 1 | Example 2 | Example 3 | Example 4 | Example 5 | Example 6 | Example 7 | Example 8 | Example 9 |
|---|---|---|---|---|---|---|---|---|---|
| f1 | 120.38 | 131.03 | 122.35 | 127.87 | 122.18 | 108.39 | 106.94 | 97.26 | 107.48 |
| f2 | −19.11 | −19.55 | −19.83 | −20.32 | −18.20 | −19.80 | −19.20 | −18.90 | −19.71 |
| f3 | 65.21 | 58.72 | 68.74 | 65.42 | 76.53 | 54.35 | 45.85 | 44.87 | 43.99 |
| f4 | 53.50 | 58.24 | 54.38 | 56.83 | 47.21 | 73.38 | 92.05 | 43.22 | 47.77 |
| f5 | — | — | — | — | — | −2567.68 | −506.83 | −51.65 | −53.05 |
| f6 | — | — | — | — | — | — | — | −321.30 | −169.79 |
| hGpH/hStop | 1.29 | 1.26 | 1.19 | 1.18 | 1.30 | 1.34 | 1.17 | 1.14 | 1.14 |
| f1/fw | 4.17 | 4.54 | 4.24 | 4.43 | 4.93 | 3.76 | 3.71 | 3.37 | 3.72 |

Consequently, the present invention can provide a zoom lens that can perform favorable correction of chromatic aberration in the entire zoom range, and can have higher performance and a smaller size than conventional ones; and an imaging apparatus including the zoom lens.

What is claimed is:

1. A zoom lens comprising, in order from an object side:
a first lens group having positive refractive power;
a second lens group having negative refractive power; and
a GR group including one or more lens groups,
wherein changing focal length is performed by varying intervals between the lens groups, and wherein
the second lens group moves toward the object during changing focal length from the wide angle end to the telephoto end,
the GR group includes at least two cemented surfaces having negative refractive power, one or more lens GpH having positive refractive power satisfying the following conditional expressions (1) and (2), and one or more lens GpL having positive refractive power satisfying the following conditional expression (3),
aperture stop arranged in the first lens group or after, and wherein
the following conditional expressions (4) and (5) are satisfied:

$$1.80 < ndpH < 2.50 \quad (1)$$

$$10.0 < vdpH < 35.0 \quad (2)$$

$$60.0 < vdpL < 100.0 \quad (3)$$

$$1.00 < hGpH/hStop < 2.00 \quad (4)$$

$$0.90 < f1/fw < 6.75 \quad (5)$$

wherein
ndpH is a refractive index related to a d-line of the lens GpH having positive refractive power,
vdpH is an Abbe constant related to the d-line of the lens GpH having positive refractive power,
vdpL is an Abbe constant related to a d-line of the lens GpL having positive refractive power,
hGpH is a maximum height from an optical axis when on-axis luminous flux passes through a surface of the lens GpH having positive refractive power on the object side, at the telephoto end of the zoom lens,
hStop is a maximum height from an optical axis when on-axis luminous flux passes through the aperture stop, at the telephoto end of the zoom lens,
f1 is a focal length of the first lens group, and
fw is a focal length of the zoom lens at the wide angle end.

2. The zoom lens according to claim 1, wherein the GR group includes one or more lens group having positive refractive power, and the lens GpH having positive refractive power is arranged in the lens group having positive refractive power.

3. The zoom lens according to claim 1, wherein the GR group includes at least two of the lens GpL having positive refractive power.

4. The zoom lens according to claim 1, wherein the following conditional expression (6) is satisfied:

$$0.95 < Fno\_t < 5.60 \quad (6)$$

wherein

Fno_t is an F number of the zoom lens at the telephoto end.

5. An imaging apparatus, comprising:

a zoom lens according to claim 1; and an imaging device arranged on the image side of the zoom lens and configured to convert an optical image formed by the zoom lens to electrical signals.

\* \* \* \* \*

UNITED STATES PATENT AND TRADEMARK OFFICE
CERTIFICATE OF CORRECTION

PATENT NO. : 10,627,609 B2
APPLICATION NO. : 15/962427
DATED : April 21, 2020
INVENTOR(S) : Keisuke Okada Page 1 of 1

It is certified that error appears in the above-identified patent and that said Letters Patent is hereby corrected as shown below:

In the Claims

Column 31, Line 64, Claim 1, before "aperture" insert -- an --

Signed and Sealed this
Seventh Day of July, 2020

Andrei Iancu
*Director of the United States Patent and Trademark Office*